(12) United States Patent
Fu

(10) Patent No.: US 12,728,821 B2
(45) Date of Patent: Sep. 8, 2026

(54) EMERGENCY DEVICE

(71) Applicant: Hainan Xunwei Technology Co., Ltd., Haikou (CN)

(72) Inventor: Gonghai Fu, Haikou (CN)

(73) Assignee: Hainan Xunwei Technology Co., Ltd., Haikou (CN)

( * ) Notice: Subject to any disclaimer, the term of this patent is extended or adjusted under 35 U.S.C. 154(b) by 0 days.

(21) Appl. No.: 19/636,859

(22) Filed: Apr. 1, 2026

(65) Prior Publication Data

US 2026/0225564 A1 Aug. 6, 2026

Related U.S. Application Data

(63) Continuation of application No. 19/322,557, filed on Sep. 8, 2025, now Pat. No. 12,606,129, which is a continuation of application No. 19/019,964, filed on Jan. 14, 2025, now Pat. No. 12,434,670.

(30) Foreign Application Priority Data

Nov. 28, 2024 (CN) ......................... 202422922776.0

(51) Int. Cl.
*B60S 5/04* (2006.01)

(52) U.S. Cl.
CPC .................................... *B60S 5/046* (2013.01)

(58) Field of Classification Search
CPC ...... B60S 5/046; F04B 35/04; F04B 2205/04; F04B 2205/05
See application file for complete search history.

(56) References Cited

U.S. PATENT DOCUMENTS

| | | | | |
|---|---|---|---|---|
| 4,574,641 A * | 3/1986 | Rosaz | B60S 5/046 137/557 |
| 5,104,295 A * | 4/1992 | Wong | B60S 5/046 73/705 |
| 5,125,800 A * | 6/1992 | Wong | G05D 16/2066 417/44.1 |
| 9,057,656 B2 * | 6/2015 | Chen | G01L 7/166 |
| 11,136,006 B2 | 10/2021 | Kobler et al. | |

(Continued)

FOREIGN PATENT DOCUMENTS

| | | |
|---|---|---|
| CN | 112727731 A | 4/2021 |
| CN | 113217332 A | 8/2021 |

(Continued)

*Primary Examiner* — Reinaldo Sanchez-Medina
(74) *Attorney, Agent, or Firm* — Westbridge IP LLC

(57) ABSTRACT

An emergency device includes: a first housing, an inflation pump, an internal power supply, a first cable, a second cable, a first circuit board and an output terminal. The inflation pump is provided with a first power device, a detection assembly, a first hose and a first air guide member, and the first power device includes a detection portion, a first air outlet portion, a first air channel and a second air channel, where the first air channel is configured to provide a first airflow to the first air outlet portion. The first circuit board is electrically connected to the inflation pump through the second cable, the second cable is used to output a second current, and a diameter of the first cable is greater than a diameter of the second cable. The first air guide member is provided with a first groove connected to the first hose.

20 Claims, 16 Drawing Sheets

(56) References Cited

U.S. PATENT DOCUMENTS

| | | | | |
|---|---|---|---|---|
| 11,686,299 | B2 | 6/2023 | Huang et al. | |
| 12,264,662 | B2 | 4/2025 | Wen | |
| 12,434,670 | B1 * | 10/2025 | Fu | B60S 5/046 |
| 12,606,129 | B1 * | 4/2026 | Fu | B60S 5/046 |
| 2005/0191193 | A1 | 9/2005 | Chou | |
| 2015/0337825 | A1 | 11/2015 | Chou | |
| 2019/0263363 | A1 * | 8/2019 | McIntyre | F04B 35/04 |
| 2020/0011311 | A1 | 1/2020 | Komiya et al. | |
| 2021/0040940 | A1 * | 2/2021 | Zhu | B60S 5/046 |
| 2023/0208135 | A1 | 6/2023 | Davidson et al. | |
| 2024/0035461 | A1 | 2/2024 | Liao | |
| 2024/0360819 | A1 | 10/2024 | Wen | |
| 2025/0137444 | A1 | 5/2025 | Lambert et al. | |

FOREIGN PATENT DOCUMENTS

| | | | |
|---|---|---|---|
| CN | 214464741 | U | 10/2021 |
| CN | 113669226 | A | 11/2021 |
| CN | 216842100 | U | 6/2022 |
| CN | 217002195 | U | 7/2022 |
| CN | 217652891 | U | 10/2022 |
| CN | 217712858 | U | 11/2022 |
| CN | 115506998 | A | 12/2022 |
| CN | 219081793 | U | 5/2023 |
| CN | 220769668 | U | 4/2024 |

* cited by examiner

EMERGENCY DEVICE

CROSS-REFERENCE TO RELATED APPLICATIONS

The present application is a continuation application of U.S. patent application Ser. No. 19/322,557, filed on Sep. 8, 2025, which is a continuation application of U.S. patent application Ser. No. 19/019,964, filed on Jan. 14, 2025, which claims priority to Chinese Patent Application No. 202422922776.0, filed on Nov. 28, 2024. All of the aforementioned applications are incorporated herein by reference in their entireties.

TECHNICAL FIELD

The present disclosure relates to the field of emergency power supply technologies, and in particular, to an emergency device.

BACKGROUND

An automobile, as a common means of transportation, plays an important role in people's lives. As the automobile runs, an air pressure in a tire may decrease, which reduces stability and safety of the automobile. Therefore, it is necessary to use an automobile inflation device to inflate the tire. However, in order to solve problems such as insufficient cylinder sealing performance and inaccurate air pressure detection, a structure of an existing automobile inflation device may become unreasonable. In addition, the existing automobile inflation device cannot meet different inflation requirements.

SUMMARY

In view of this, purposes of the present disclosure are to provide an emergency device, so as to solve problems in that an existing automobile inflation device is unreasonable in structure and cannot meet different inflation requirements.

The present disclosure provides an emergency device, including: a first housing; and an inflation pump, an internal power supply, a first cable, a second cable, a first circuit board and an output terminal that are disposed in the first housing, where the internal power supply is electrically connected to the output terminal through the first cable, and the first cable is used to output a first current for activating an automobile; the inflation pump is provided with a first power device, a detection assembly, a first hose and a first air guide member, and the detection assembly includes a second circuit board and an air pressure sensor; the internal power supply is electrically connected to the first circuit board and the second circuit board, the first circuit board is electrically connected to the inflation pump through the second cable, the second cable is used to output a second current, and a diameter of the first cable is greater than a diameter of the second cable; the first power device includes a detection portion, a first air outlet portion, a first air channel and a second air channel, where the first air channel is configured to provide a first airflow to the first air outlet portion, the detection portion is provided with the second air channel, and the first air channel is connected to the second air channel; and an end of the first hose is in sealed connection to the detection portion, and another end of the first hose is in sealed connection to the first air guide member, the first air guide member is provided with a first groove, and the first groove is connected to the first hose, the air pressure sensor is installed on the second circuit board and protrudes from a surface of the second circuit board, the first groove surrounds a circumferential side wall of the air pressure sensor, the first air guide member is in sealed connection to the second circuit board, and the detection assembly is used to detect air pressure information of the second air channel.

The present disclosure provides an emergency device, including: a first housing; an inflation pump, an internal power supply, and a first circuit board that are disposed in the first housing. The inflation pump is provided with a first power device, a detection assembly, and a first check valve. The internal power supply is electrically connected to the first circuit board. The first circuit board is electrically connected to the inflation pump. The first power device includes a first driving assembly and a first inflation assembly. The first inflation assembly includes a first transmission assembly, a first cylinder assembly and a connecting pipe, an end of the first transmission assembly is connected to the first driving assembly, another end of the first transmission assembly is connected to an end of the first cylinder assembly, the connecting pipe is provided with a first air inlet portion and a first air outlet portion, and another end of the first cylinder assembly is connected to the first air inlet portion. The first cylinder assembly is provided with a cylinder air outlet portion that is in sealed connection to the first air inlet portion, and the cylinder air outlet portion is provided a cylinder air outlet port. The first inflation assembly is provided with a first air channel and a second air channel, the first air channel is connected to the second air channel, the first driving assembly is configured to provide power to the first inflation assembly, and the first inflation assembly is configured to provide first airflow to the first air outlet portion through the first air channel. The first inflation assembly is provided with a detection portion close to connection between the first cylinder assembly and the connecting pipe, and the detection portion is provided with the second air channel. The detection assembly is in sealed connection to the detection portion, and is configured to detect air pressure information in the second air channel. A first accommodating space is formed by the cylinder air outlet portion and the connecting pipe. The first check valve is disposed in the first accommodating space, and is configured to allow the first power device to provide the first airflow to the first air outlet portion through the cylinder air outlet port.

Preferably, the first cylinder assembly includes a connecting rod, a piston and a cylinder. An end of the connecting rod is connected to the first transmission assembly, and another end of the connecting rod is connected to the piston. The cylinder includes a first cylinder and a second cylinder, and a diameter of the first cylinder is greater than a diameter of the second cylinder. The piston is disposed in the first cylinder, and the detection portion is disposed on the second cylinder.

Preferably, the emergency device further includes a first protection member which is disposed between the connecting pipe and the first housing. The first protection member is provided with a second accommodating space. The second accommodating space is used for accommodating at least a part of the connecting pipe.

Preferably, the emergency device further includes an output terminal, two first cables, and two second cables. The internal power supply is electrically connected to the output terminal through the first cables, and the first circuit board is electrically connected to the inflation pump through the second cables. A diameter of the first cable is greater than that of the second cable. The first cables are used to output a first current for activating an automobile, and the second cables are used to output a second current. The first current is greater than the second current. In an actual product, a color of one first cable is red, and a color of another first cable is black.

Preferably, the first cylinder assembly includes a connecting rod, a piston and a cylinder. An end of the connecting rod is connected to the first transmission assembly, and another end of the connecting rod is connected to the piston. The piston is disposed in the cylinder, and the detection portion is disposed on the connecting pipe.

Preferably, the inflation pump includes a first fixing member. The detection portion is provided with a second groove on a circumferential side wall of the detection portion, and the second groove is configured to accommodate a part of the detection assembly. The first fixing member is connected to the detection portion, and is configured to limit displacement of the detection assembly on the detection portion.

Preferably, the inflation pump includes a first hose and a first air guide member, an end of the first hose is in sealed connection to the detection portion, and another end of the first hose is in sealed connection to the first air guide member. The first air guide member is provided with a first groove, the first groove is configured to accommodate at least a part of the detection assembly, and the first groove is connected to the first hose. The first air guide member is in sealed connection to the detection assembly.

Preferably, the connecting pipe includes a first air pipe, the first air pipe includes a first sub-first air pipe and a second sub-first air pipe that are connected in sequence, the first sub-first air pipe includes a first sub-first air inlet port and a second sub-first air inlet port, a cross-sectional area of the first sub-first air inlet port is greater than a cross-sectional area of the second sub-first air inlet port, the first accommodating space is formed by the first sub-first air pipe and the cylinder air outlet portion, the first sub-first air pipe is provided with at least one first protrusion on an inner wall of the first sub-first air pipe, and the at least one first protrusion is configured to prevent the first check valve from blocking the second sub-first air inlet port.

Preferably, the first check valve is provided with a base and a fourth protrusion, at least one fourth protrusion is disposed on an end, facing the connecting pipe, of the base, the at least one fourth protrusion is used to prevent the first check valve from blocking the first air inlet portion, and a cross-sectional area of the base is greater than a cross-sectional area of the cylinder air outlet port.

Preferably, the inflation pump includes an elastic member, the elastic member is disposed in the first accommodating space, and the first check valve is disposed between the elastic member and the cylinder air outlet port.

Preferably, the elastic member is provided with a first through hole, and the elastic member is in a compressed state in the first accommodating space.

Preferably, the first check valve is provided with a base, a second protrusion and a third protrusion, and a cross-sectional area of the base is greater than a cross-sectional area of the cylinder air outlet port. The second protrusion extends into the first through hole, and the third protrusion extends into the cylinder air outlet port.

Preferably, the cylinder air outlet port includes a first sub-cylinder air outlet port and a second sub-cylinder air outlet port, and a cross-sectional area of the first sub-cylinder air outlet port is greater than a cross-sectional area of the second sub-cylinder air outlet port. The third protrusion extends into the first sub-cylinder air outlet port or the second sub-cylinder air outlet port.

Preferably, the inflation pump includes a second hose and a second air guide member, an end of the second hose is in sealed connection to the first air outlet portion, another end of the second hose is in sealed connection to an end of the second air guide member, and another end of the second air guide member is used for connecting to a device to be inflated.

Preferably, the second air guide member is provided with a third air inlet port and a third air outlet port, the third air inlet port is in sealed connection to the second hose, and the third air outlet port is used for connecting to a device to be inflated. The third air inlet port and the third air outlet port are not coaxial.

Preferably, the inflation pump further includes a second fixing member, the second air guide member is provided with a connecting hole that connects to both the third air inlet port and the third air outlet port, and the second fixing member is used for sealing the connecting hole.

Preferably, the detection assembly includes a second circuit board and an air pressure sensor, the second circuit board is electrically connected to the first circuit board, and the air pressure sensor is connected to the second circuit board.

Preferably, a third groove is formed on a side, facing the cylinder air outlet portion, of the first air inlet portion, the cylinder air outlet portion is provided with a fifth protrusion, the fifth protrusion is provided with a cylinder air outlet port, and the third groove is used for accommodating a part or all of the fifth protrusion.

Preferably, a first sealing member is disposed between the third groove and the fifth protrusion.

Preferably, the first cylinder assembly includes a connecting rod, a cylinder sealing member, a piston and a cylinder, the piston is disposed in the cylinder and is provided with a first side portion and a second side portion, the first side portion is connected to the connecting rod, and the second side portion is disposed opposite to the first side portion; and a first surface is provided on a side, facing the second side portion, of the first side portion, a second surface is provided on a side, facing the first side portion, of the second side portion, a piston accommodating space is formed by the first surface and the second surface, and the piston accommodating space is configured to accommodate at least a part of the cylinder sealing member.

Preferably, a maximum distance between an outer edge of a projection, on the first surface, of the second side portion and a center of the first surface is less than a maximum distance between an outer edge of the first surface and the center of the first surface.

Preferably, the second side portion is provided with at least one side groove on a periphery of the second side portion, an opening of the at least one side groove faces a side wall of the cylinder, and the side wall of the cylinder is parallel or substantially parallel to a motion direction of the piston.

Preferably, the cylinder sealing member is provided with a fifth through hole and a fifth groove, an opening of the fifth groove faces the second side portion, and the piston passes through the fifth through hole.

Preferably, the fifth groove is provided with a first arm and a second arm, a distance between the first arm and an axis of the fifth through hole is less than a distance between the second arm and the axis of the fifth through hole, and the piston accommodating space is used for accommodating at least a part of the first arm.

Preferably, the cylinder sealing member is disposed between a plane where the first surface is located and a plane where the second surface is located.

Preferably, the cylinder sealing member is provided with a first end face and a second end face, the first end face is disposed close to the first side portion, the second end face is disposed close to the second side portion, and a distance between an outer edge of a projection, on the second end face, of the first end face and a center of the second end face is less than or equal to a distance between an outer edge of the second end face and the center of the second end face.

Preferably, the emergency device further includes a second power device and a second check valve, the connecting pipe includes a first air pipe and a second air pipe, the first air pipe is disposed in the second air pipe, the detection portion is connected to the first air pipe, the connecting pipe is provided with a second air inlet portion and a second air outlet portion, and the first airflow flows through the first air pipe. The second power device includes a second housing, the second housing is provided with a large-flow air inlet portion and a large-flow air outlet portion, the large-flow air outlet portion is connected to the second air inlet portion, the large-flow air outlet portion is provided with a large-flow air outlet port, a large-flow accommodating space is formed by the large-flow air outlet portion and the connecting pipe, the second check valve is disposed in the large-flow accommodating space, and is used to allow the second power device to provide second airflow to the second air outlet portion, and the second airflow flows through the second air pipe.

Preferably, an air pressure of the first airflow is greater than an air pressure of the second airflow.

Preferably, in a unit of time, an air volume of the second airflow flowing through the large-flow air outlet port is greater than an air volume of the first airflow flowing through the cylinder air outlet port.

Preferably, the first air pipe includes a first sub-first air pipe, a second sub-first air pipe and a third sub-first air pipe which are connected in sequence, the first sub-first air pipe includes a first sub-first air inlet port and a second sub-first air inlet port, a cross-sectional area of the first sub-first air inlet port is greater than a cross-sectional area of the second sub-first air inlet port, the first accommodating space is formed by the first sub-first air pipe and the cylinder air outlet portion, and a pipe cross-sectional area of the third sub-first air pipe is greater than a pipe cross-sectional area of the second sub-first air pipe.

Preferably, the first air pipe and the second air pipe are coaxial or substantially coaxial.

Preferably, the first air pipe further includes a fourth sub-first air pipe and a fifth sub-first air pipe which are connected in sequence, the fourth sub-first air pipe includes a first sub-first air outlet port and a second sub-first air outlet port, a cross-sectional area of the first sub-first air outlet port is greater than a cross-sectional area of the second sub-first air outlet port, and the first airflow flows through the first sub-first air outlet port through the second sub-first air outlet port.

Preferably, the first air pipe further includes a sixth sub-first air pipe, and the fourth sub-first air pipe, the fifth sub-first air pipe, and the sixth sub-first air pipe are sequentially connected. A pipe cross-sectional area of the sixth sub-first air pipe is greater than a pipe cross-sectional area of the fifth sub-first air pipe.

Preferably, the fourth sub-first air pipe is provided with an air pipe sealing member, and the air pipe sealing member is provided with a third through hole.

Preferably, a diameter of the third through hole is less than a diameter of the second sub-first air outlet port.

Preferably, the connecting pipe includes a first connecting pipe and a second connecting pipe, the first connecting pipe is provided with the first air inlet portion and the second air inlet portion, the second connecting pipe is provided with the first air outlet portion and the second air outlet portion, the first connecting pipe is detachably connected to the second connecting pipe, the first inflation assembly is provided with the detection portion close to connection between the first cylinder assembly and the first connecting pipe, the first accommodating space is formed by the cylinder air outlet portion and the first connecting pipe, the first airflow flows through the first air outlet portion through the first air inlet portion, and the second airflow flows through the second air outlet portion through the second air inlet portion.

Preferably, the first driving assembly includes a motor and a second protection member, and the motor is provided with a first junction portion on a side, facing the second protection member, of the motor. The second protection member covers the motor, the second protection member is provided with a second junction portion on a side, facing the motor, of the second protection member, the first junction portion is in clamped connection to the second junction portion, and the second protection member is provided with a first opening.

Preferably, the first cylinder assembly includes a connecting rod, a piston, and a cylinder, the connecting rod includes a rotating portion, a rod body and a piston connecting portion, the rotating portion includes a first end and a second end, the rotating portion is connected to the first transmission assembly, the first end faces the first transmission assembly, the second end is disposed opposite to the first end, the piston connecting portion is connected to the piston, the piston is disposed in the cylinder, the rod body includes a first face and a second face, the first face is perpendicular to or substantially perpendicular to an axis of the rotating portion, the second face is disposed opposite to the first face, and a distance between a plane where the first end is located and the first face is not equal to a distance between a plane where the second end is located and the second face.

Preferably, the distance between the plane where the first end is located and the first face is less than the distance between the plane where the second end is located and the second face.

Preferably, the first cylinder assembly includes a connecting rod, a piston and a cylinder, the connecting rod includes a rotating portion, a rod body and a piston connecting portion, the rod body includes a reinforcing face and a first reinforcing rib, the reinforcing face is parallel or substantially parallel to an axis of the rotating portion, and the first reinforcing rib is disposed on the reinforcing face and is connected to the piston.

Preferably, a projection, on the piston, of an end, away from the piston, of the first reinforcing rib falls within a region where a contact surface between the piston and the first reinforcing rib is located.

Preferably, the rod body includes a first face and a second face, the first face is perpendicular to or substantially perpendicular to an axis of the rotating portion, the second face is disposed opposite to the first face, and a distance between a plane where the first reinforcing rib is located and the first face is less than a distance between the plane where the first reinforcing rib is located and the second face.

Preferably, the first cylinder assembly includes a connecting rod, a piston and a cylinder, the connecting rod includes a sixth groove and a second reinforcing rib, the second reinforcing rib is disposed in the sixth groove, the piston is provided with a first side portion and a second side portion, the first side portion is connected to the connecting rod, the second side portion is disposed opposite to the first side portion, the first side portion is provided with a first surface on a side, facing the second side portion, of the first side portion, and the second reinforcing rib is parallel or substantially parallel to the first surface.

Preferably, a connection port is formed at connection between the first air channel and the second air channel, and a distance, along a motion direction of the piston, between the connection port and the cylinder air outlet port is greater than or equal to 0.5 cm and less than or equal to 2 cm.

Compared with the related art, the beneficial effects of the present disclosure are as follows. In the emergency device of the present disclosure, the internal power supply can output a first current to an automobile, and the first power device outputs the first airflow, so that on the basis of a reasonable structural layout, an integration of an inflation apparatus and an emergency device is realized, which not only can meet automobile ignition requirements, but also can satisfy inflation requirements. In addition, the detection assembly can detect the air pressure information, so as to meet requirements for different air pressures during inflation. The emergency device of the present disclosure further includes the second power device for outputting the second airflow, so that more inflation requirements can be met.

In order to make the above purposes, features and advantages of the present disclosure more obvious and understandable, the following detailed description is provided with reference to the drawings, using preferred embodiments as examples.

BRIEF DESCRIPTION OF THE DRAWINGS

In order to more clearly illustrate the specific embodiments of the present disclosure or the technical solutions in the related art, the drawings required in the description of the specific embodiments or the related art are briefly described below. Obviously, the drawings in the following description are some embodiments of the present disclosure, and as for a person having ordinary skill in the art, other drawings may also be obtained according to these drawings without creative efforts.

DETAILED DESCRIPTION OF THE EMBODIMENTS

Figure 1:
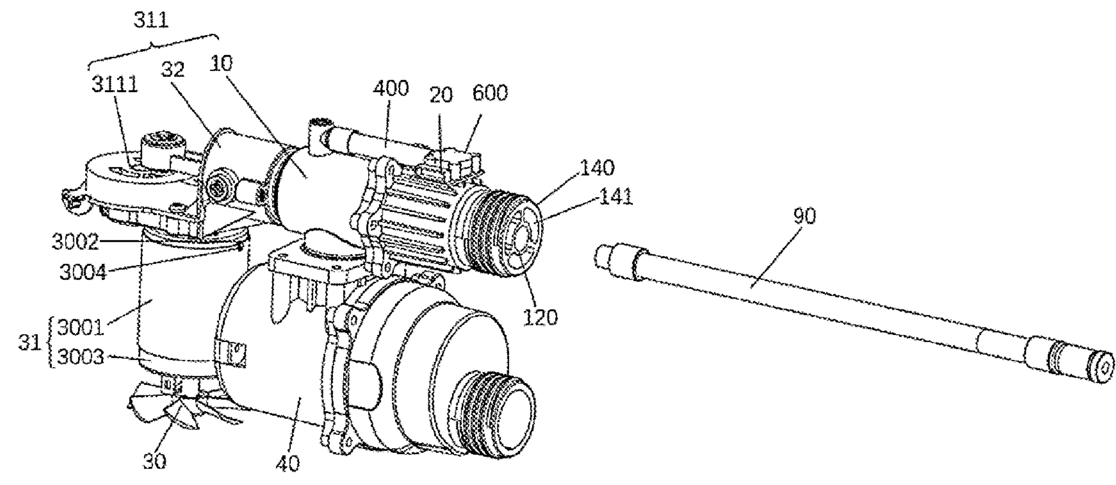
FIG. 1 is a schematic exploded structural diagram of an inflation pump and an external air pipe capable of outputting first airflow and second airflow in an emergency device according to an embodiment of the present disclosure.
Figure 2:
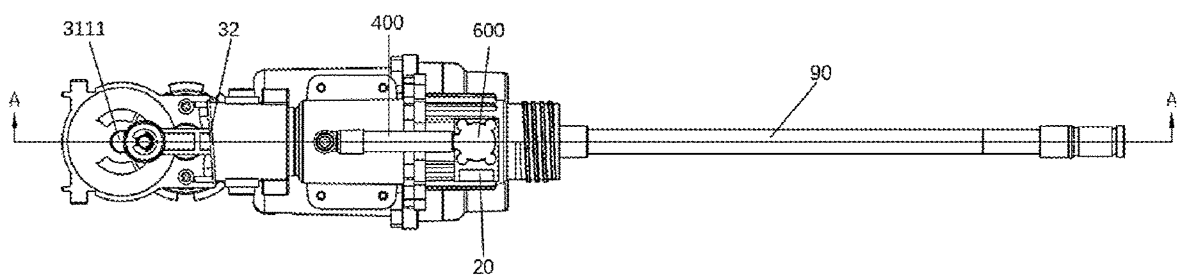
FIG. 2 is a schematic structural diagram of an inflation pump and an external air pipe capable of outputting first airflow and second airflow in an emergency device according to an embodiment of the present disclosure.

The following specific embodiments are provided to assist readers in obtaining a thorough understanding of methods, apparatuses, and/or systems described herein. However, various changes, modifications, and equivalents of the methods, apparatuses, and/or systems described herein will be apparent after the disclosed contents of the present disclosure are understood. For example, an order of operations described herein is merely an example and is not limited to an order set forth herein, but may be altered in ways that will be apparent after the disclosed contents of the present disclosure are understood, except for those operations that must occur in a particular order. In addition, to improve clarity and conciseness, descriptions of features known in the art may be omitted.

The features described herein may be implemented in different forms and should not be construed as being limited to the examples described herein. More specifically, the examples described herein are given only to illustrate some of many possible ways of implementing the methods, apparatuses, and/or systems described herein, which will become apparent after the disclosed contents of the present disclosure are understood.

In the entire specification, when an element (such as a layer, a region, or a substrate) is described as being "on" another element, "connected to" another element, "attached to" another element, "above" another element or "covering" another element, the element may be "directly on" the another element, "directly connected to" the another element, "directly attached to" the another element, "directly above" the another element or "directly covering" the another element, or there may be one or more other elements between the element and the another element. In contrast, when an element is described as being "directly on" another element, "directly connected to" another element, "directly attached to" another element, "directly above" another element or "directly covering" another element, there may be no other elements between the element and the another element.

As used herein, the term "and/or" includes any one and any two or more of the listed related items.

Although the terms such as "first", "second" and "third" may be used herein to describe various members, assemblies, regions, layers, or portions, these members, assemblies, regions, layers, or portions are not limited by these terms. More specifically, these terms are only used to distinguish one member, one assembly, one region, one layer or one portion from another member, another assembly, another region, another layer, or another portion. Thus, a first member, a first assembly, a first region, a first layer, or a first portion referred to in the examples described herein may also be referred to as a second member, a second assembly, a second region, a second layer, or a second portion without departing from the teachings of the examples.

For ease of description, the spatial relationship terms such as "on", "above", "under" and "below" may be used herein to describe a relationship between one element and another element shown in the drawings. Such spatial relationship terms are intended to encompass not only different orientations of a device in use or in operation but also the orientations depicted in the drawings. For example, if the device in the drawings is inverted, an element that is located "on" or "above" another element will then become located "under" or "below" the another element. Thus, the phrase "an element is on another element" includes both the orientation where the element is above the another element and the orientation where the element is below the another element, depending on the spatial orientation of the device. The device may also be positioned in other ways (e.g., rotated 90 degrees or placed in other orientations), and the spatial relationship terms used herein will be interpreted accordingly. The terms used herein are only for the purposes of describing various examples and are not intended to limit the present disclosure. Unless the context clearly indicates otherwise, the singular forms are also intended to include the plural forms. The terms "include," "comprise," and "have" list the stated features, quantities, operations, members, elements, and/or their combinations that exist, but do not exclude the presence or addition of one or more other features, quantities, operations, members, elements, and/or their combinations.

Due to manufacturing techniques and/or tolerances, variations in the shape shown in the drawings may occur. Therefore, the examples described herein are not limited to the specific shapes shown in the drawings, but include variations in the shape that may occur during manufacturing.

The features of the examples described herein may be combined in various ways as will be apparent after the disclosed contents of the present disclosure are understood. Moreover, although the examples described herein have a variety of constructions, other constructions are possible, as will be apparent after the disclosed contents of the present disclosure are understood.

An automobile, as a common means of transportation, plays an important role in people's lives. As the automobile runs, an air pressure in a tire may decrease, which reduces stability and safety of the automobile. Therefore, it is necessary to use an automobile inflation device to inflate the tire.

A paddle board is a type of water sports equipment. Compared with a hard paddle board, an inflatable paddle board has advantages of being foldable when deflated, convenient for transportation and storage. When in use, a paddle board inflation device is used to inflate the inflatable paddle board to expand the inflatable paddle board, and therefore, the inflatable paddle board is becoming increasingly popular among water sports enthusiasts.

In order to solve problems such as insufficient cylinder sealing performance and inaccurate air pressure detection, a structure of an existing automobile inflation device may become unreasonable. In addition, an existing automobile inflation device, an existing automotive emergency start power supply and an existing paddle board inflation device are separate products. If a paddle board is inflated by an automobile inflation device, a flow rate of gas output by the automobile inflation device is too low, which results in long inflation time, thereby easily causing the automobile inflation device to become damaged due to overheating. Since an air pressure of airflow generated by the paddle board inflation device is too low to inflate a tire of an automobile, an existing inflation device not only has an unreasonable structure but also fails to meet different inflation requirements.

The present disclosure provides an emergency device, so as to solve problems in that an existing automobile inflation device and an existing automotive emergency start power supply are separate products and a structure is unreasonable, and so as to also solve problems in that an existing inflation device that can generate high-pressure airflow cannot provide large-flow gas, or an existing inflation device that can generate large-flow gas cannot provide high-pressure airflow.

Below, an emergency device provided by the present disclosure is described in detail with reference to FIGS. 1 to 19.

Figure 5:
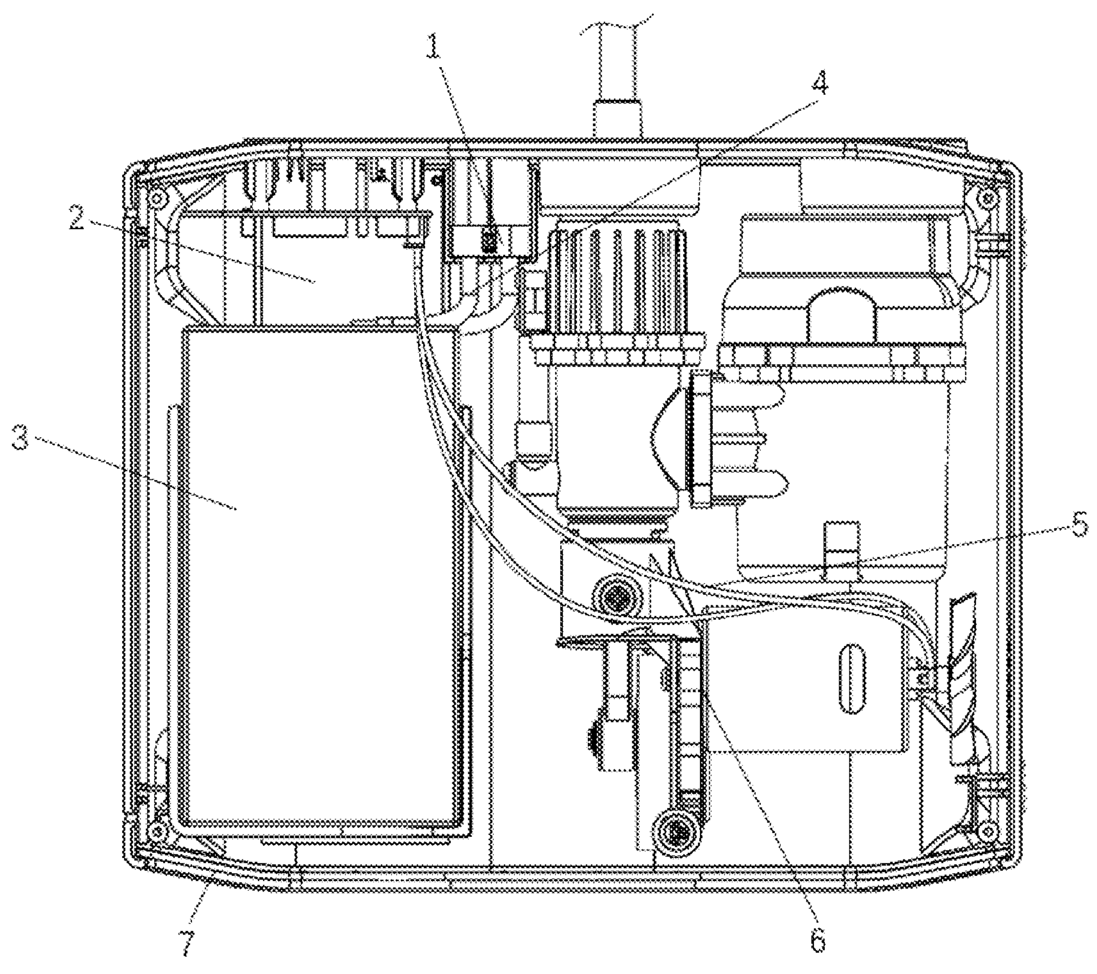
FIG. 5 is a schematic internal structural diagram of an emergency device according to an embodiment of the present disclosure.
Figure 8:
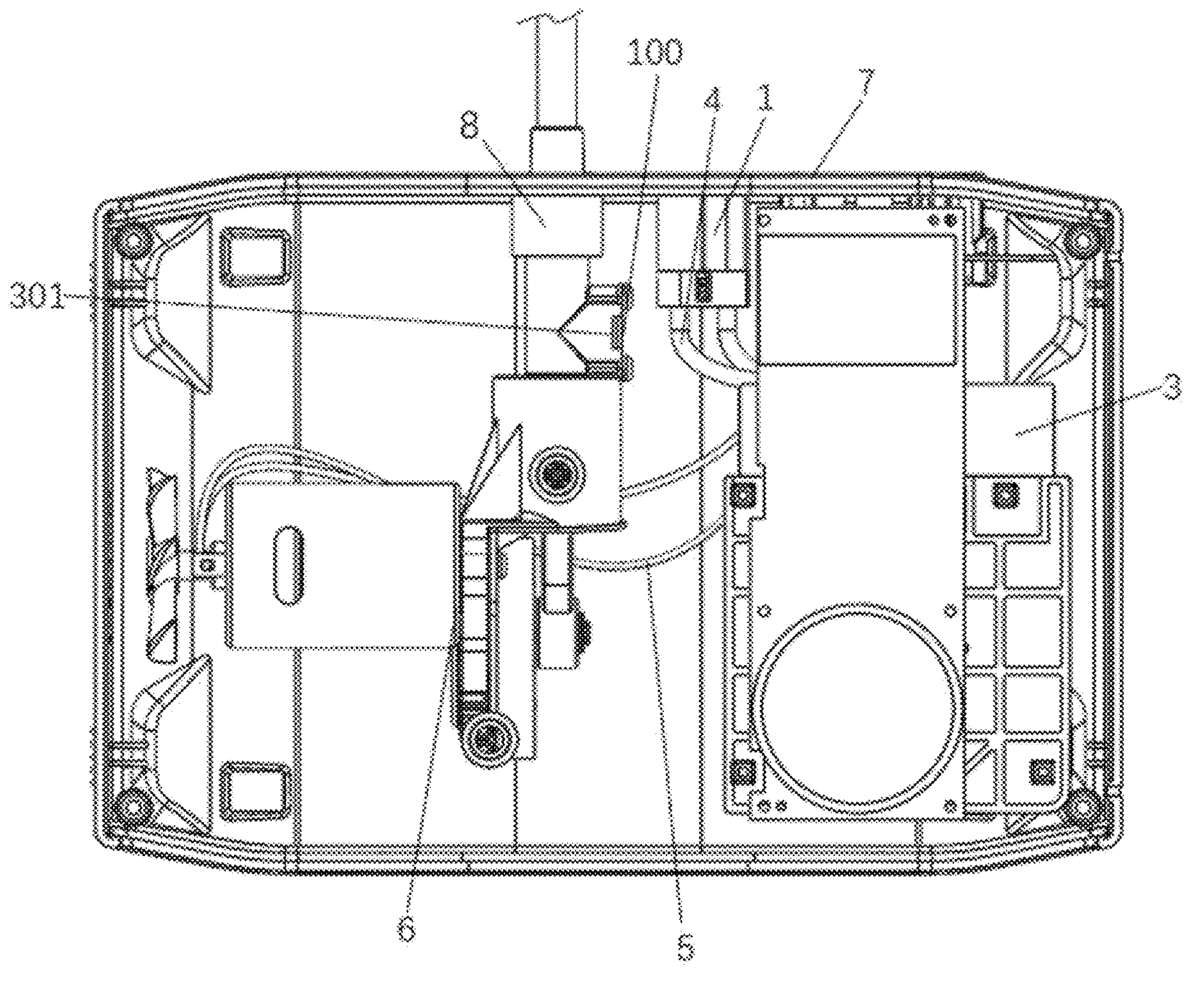
FIG. 8 is a schematic internal structural diagram of an inflation pump with a first protection member in another perspective, in an emergency device according to an embodiment of the present disclosure.
Figure 10:
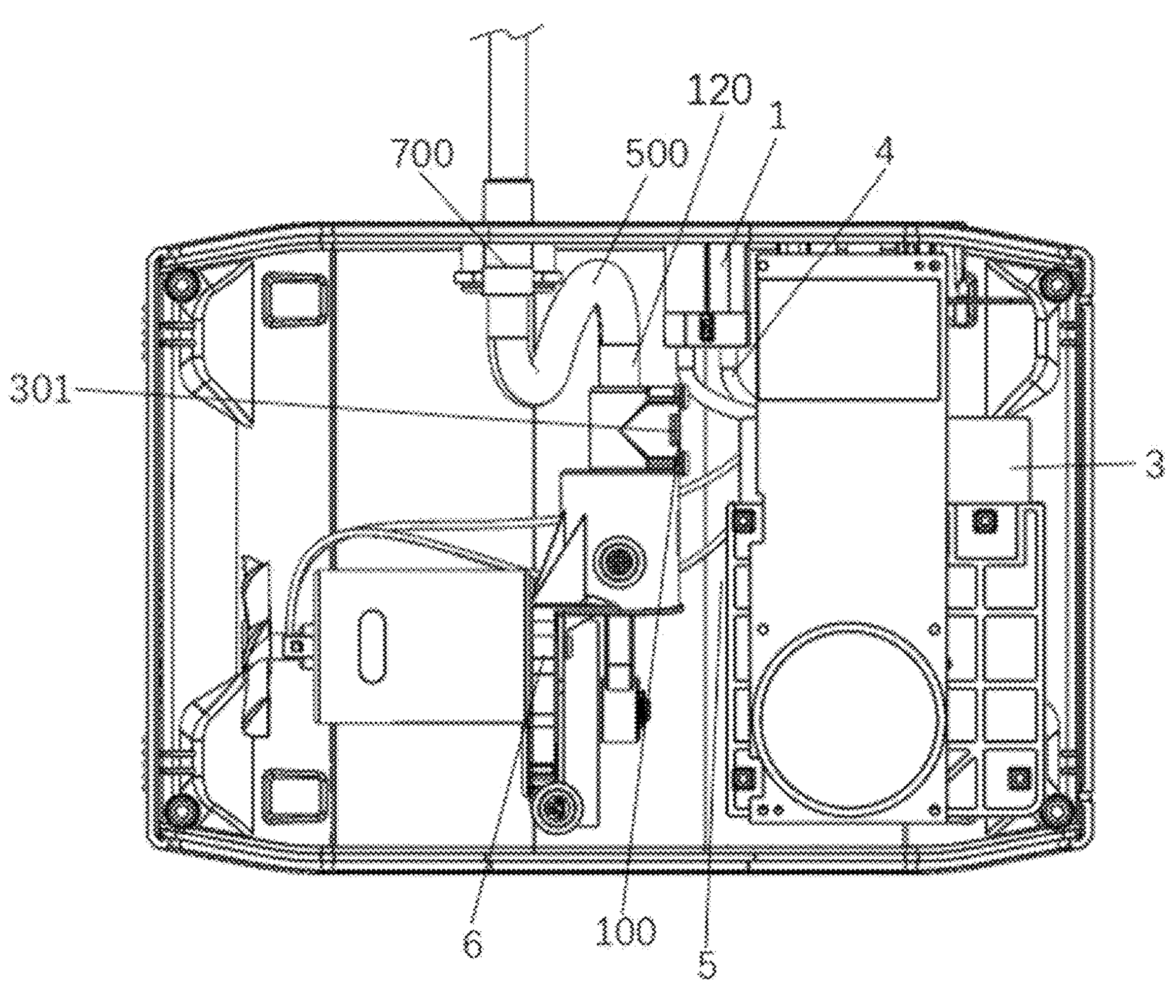
FIG. 10 is a schematic internal structural diagram of an inflation pump with a second hose in an emergency device according to an embodiment of the present disclosure.

As shown in FIG. 5, FIG. 8 and FIG. 10, the present disclosure provides an emergency device, including a first housing 7, an inflation pump 6, an internal power supply 3, an output terminal 1, two first cables 4, two second cables 5, and a first circuit board 2. The inflation pump 6, the internal power supply 3, the output terminal 1, the two first cables 4, the two second cables 5, and the first circuit board 2 are provided in the first housing 7. The internal power supply 3 is electrically connected to the output terminal 1 through the first cables 4, the first cables 4 are used to output a first current for activating an automobile, and when an automobile battery is depleted, the first current is used for activating a motor of the automobile. The internal power supply 3 is electrically connected to the first circuit board 2, the first circuit board 2 is electrically connected to the inflation pump 6 through the second cables 5, the second cables 5 are used to output a second current, and the first current is greater than the second current. For example, the internal power supply 3 may be a lithium battery, a super capacitor, or the like; an end of one first cable 4 is electrically connected to a positive electrode tab (not shown in the figure) of the internal power supply 3, another end of the one first cable 4 is electrically connected to a positive terminal of the output terminal 1, and in an actual product, a color of the one first cable 4 is red; an end of another first cable 4 is electrically connected to a negative electrode tab (not shown in the figure) of the internal power supply 3, another end of the another first cable 4 is electrically connected to a negative terminal of the output terminal 1, and in an actual product, a color of the another first cable 4 is black; and one second cable 5 is electrically connected to a positive terminal of the inflation pump 6, and in an actual product, a color of the one second cable 5 is red; and another second cable 5 is electrically connected to a negative terminal of the inflation pump 6, and in an actual product, a color of the another second cable 5 is black. In order to prevent the positive electrode tab of the internal power supply 3 from being electrically connected to the negative terminal of the output terminal 1 during installation, the colors of the first cables 4 are red and black; and in order to prevent a positive terminal of the first circuit board 2 from being electrically connected to the positive terminal of the inflation pump 6 during installation, the colors of the second cables 5 are red and black. A diameter of the first cable 4 is greater than a diameter of the second cable 5. This choice of different diameters is made to ensure product's functionality, and also effectively reduce costs and enhance service life.

In this embodiment, the internal power supply 3 can output the first current to the automobile, and the inflation pump 6 can inflate a device to be inflated, so that on the basis of a reasonable structural layout, an integration of an inflation apparatus and an automotive emergency start power supply is realized, which not only can meet automobile ignition requirements, but also can satisfy inflation requirements.

More specifically, as shown in FIGS. 1 to 10 and FIG. 14, in this embodiment, the inflation pump 6 is provided with a first power device 30, a detection assembly 20 and a first check valve 50. The first power device 30 includes a first driving assembly 31 and a first inflation assembly 311. The first inflation assembly 311 includes a first transmission assembly 3111, a first cylinder assembly 32 and a connecting pipe 10. The first transmission assembly 3111 includes a transmission wheel and an eccentric wheel, an end of the first transmission assembly 3111 is connected to the first driving assembly 31, and another end of the first transmission assembly 3111 is connected to an end of the first cylinder assembly 32. The connecting pipe 10 is provided with a first air inlet portion 110 and a first air outlet portion 120, and another end of the first cylinder assembly 32 is connected to the first air inlet portion 110. The first air inlet portion 110 is provided with a first air inlet port 111, and the first air outlet portion 120 is provided with a first air outlet port 121. For example, a central axis of the first air inlet port 111 is parallel or substantially parallel to a central axis of the first air outlet port 121, or a central axis of the first air inlet port 111 is perpendicular or substantially perpendicular to a central axis of the first air outlet port 121, or a central axis of the first air inlet port 111 and a central axis of the first air outlet port 121 are on a same straight line or substantially on a same straight line. The first cylinder assembly 32 is provided with a cylinder air outlet portion 35 which is in sealed connection to the first air inlet portion 110, the cylinder air outlet portion 35 is provided with a cylinder air outlet port 352, a first accommodating space 112 is formed by the cylinder air outlet portion 35 and the connecting pipe 10, and the first check valve 50 is disposed in the first accommodating space 112, and is configured to allow the first power device 30 to provide first airflow to the first air outlet portion 120 through the cylinder air outlet port 352. The first inflation assembly 311 is provided with a first air channel 1001 and a second air channel 1002, the first air channel 1001 is connected to the second air channel 1002, and a connection port 1003 is formed at connection between the first air channel 1001 and the second air channel 1002. The first inflation assembly 311 is provided with a detection portion 13 close to connection between the first cylinder assembly 32 and the connecting pipe 10, and the detection portion 13 is provided with the second air channel 1002. The detection assembly 20 is in sealed connection to the detection portion 13, and is configured to detect air pressure information in the second air channel 1002. The first driving assembly 31 is configured to provide power to the first inflation assembly 311, so that the first inflation assembly 311 is configured to provide the first airflow to the first air outlet portion 120 through the first air channel 1001, and the detection assembly 20 can detect the air pressure information, so as to meet requirements for different air pressures during inflation.

The first air channel 1001 can guide the first airflow from the cylinder air outlet port 352 to the first air outlet portion 120. The second air channel 1002 can guide airflow in the first air channel 1001 to the detection assembly 20. When the inflation pump 6 is connected to a device to be inflated and stops providing the first airflow, the detection assembly 20 can detect the air pressure information of the device to be inflated in the second air channel 1002.

In this embodiment, the detection portion 13 is disposed close to the connection between the first cylinder assembly 32 and the connection pipe 10, i.e., the detection portion 13 may be disposed on a cylinder 34, or may be disposed on the connection pipe 10.

Figure 7:
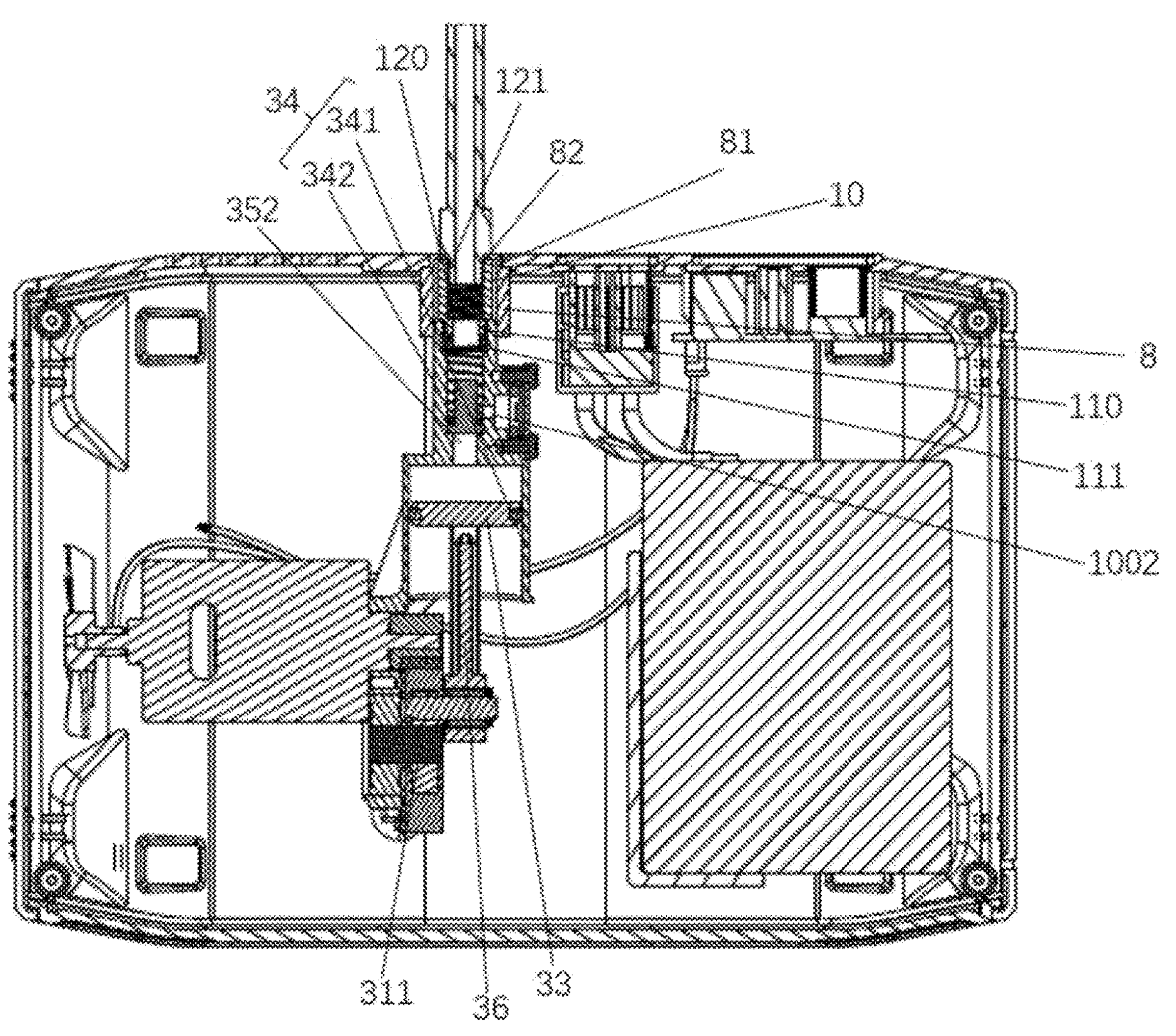
FIG. 7 is a schematic cross-sectional structural diagram of an inflation pump with a first protection member in an emergency device according to an embodiment of the present disclosure.
Figure 9:
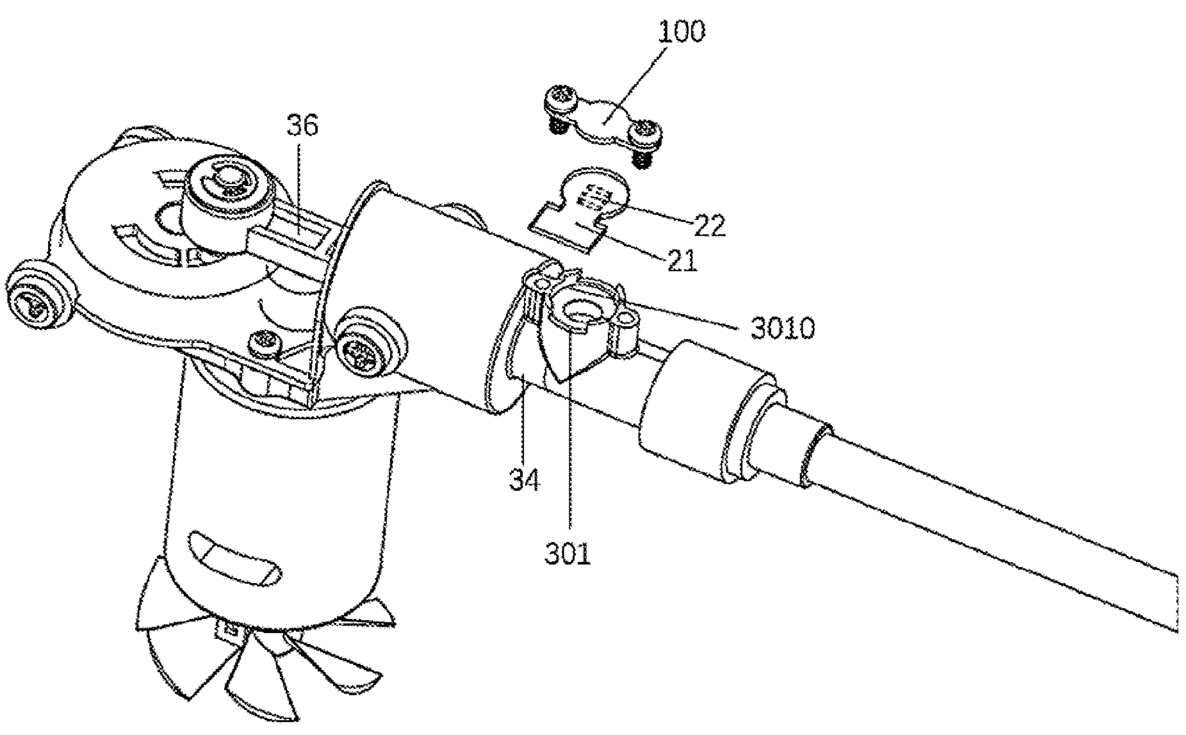
FIG. 9 is a schematic exploded structural diagram of a first fixing member on an inflation pump with a first protection member in an emergency device according to an embodiment of the present disclosure.

In a first optional embodiment, as shown in FIG. 7, FIG. 8 and FIG. 9, the first cylinder assembly 32 includes a connecting rod 36, a piston 33 and a cylinder 34, an end of the connecting rod 36 is connected to the first transmission assembly 3111, and another end of the connecting rod 36 is connected to the piston 33. The cylinder 34 includes a first cylinder 341 and a second cylinder 342, a diameter of the first cylinder 341 is greater than a diameter of the second cylinder 342, the piston 33 is disposed in the first cylinder 341, the detection portion 13 is disposed on the second cylinder 342, and the detection assembly 20 detects the air pressure information through the detection portion 13 on the second cylinder 342.

Further, as shown in FIG. 7 and FIG. 8, the emergency device further includes a first protection member 8, and the first protection member 8 is disposed between the connecting pipe 10 and the first housing 7, so as to protect the connecting pipe 10. The first protection member 8 is provided with a second accommodating space 81 and a fourth through hole (also referred to as a protection member through hole) 82, the second accommodating space 81 is used for accommodating the connecting pipe 10, i.e., at least a part of the connecting pipe 10 is disposed in the second accommodating space 81, and an external air pipe 90 extends into the fourth through hole 82, so as to connect to the connecting pipe 10.

Figure 3:
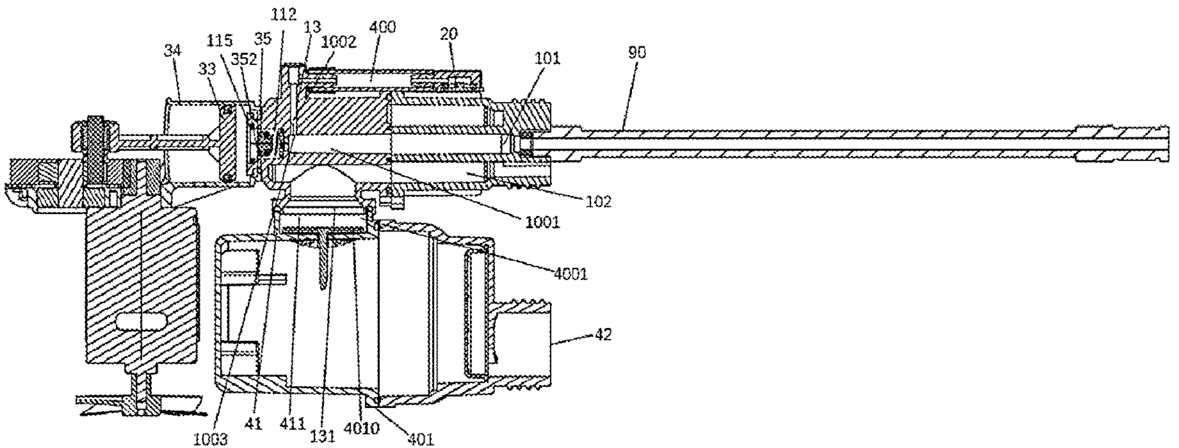
FIG. 3 is a cross-sectional view taken along the A-A in FIG. 2.
Figure 6:
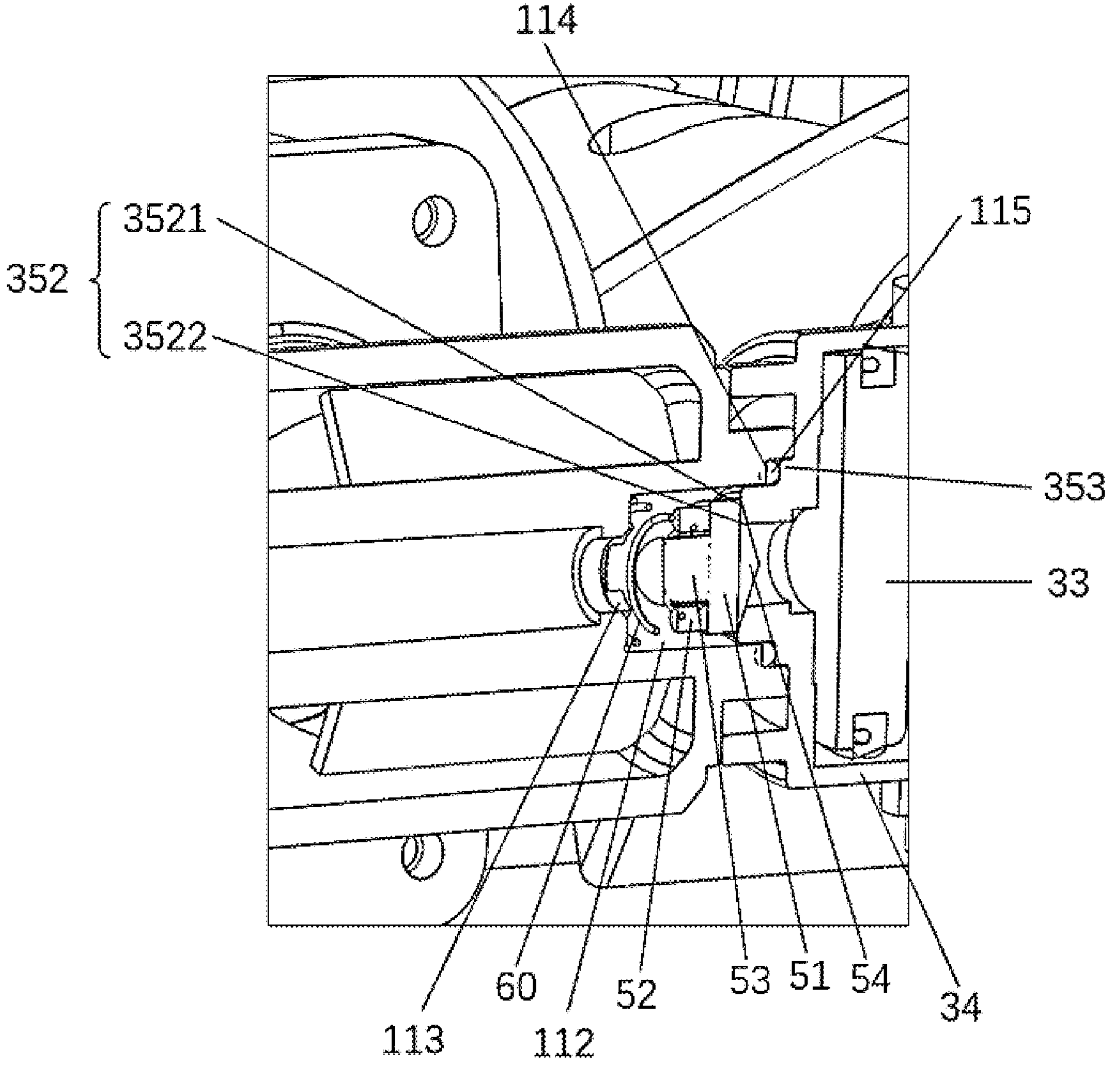
FIG. 6 is a schematic structural diagram of a first check valve in an emergency device according to an embodiment of the present disclosure.

In a second optional installation method, as shown in FIG. 1, FIG. 3 and FIG. 6, the first cylinder assembly 32 includes a connecting rod 36, a piston 33, and a cylinder 34, an end of the connecting rod 36 is connected to the first transmission assembly 3111, and another end of the connecting rod 36 is connected to the piston 33. The piston 33 is disposed in the cylinder 34, the detection portion 13 is disposed on the connecting pipe 10, and the detection assembly 20 detects the air pressure information through the detection portion 13 on the connecting pipe 10.

In this embodiment, there are at least two installation methods for installing the detection assembly 20 on the detection portion 13.

In a first optional method, as shown in FIG. 7 and FIG. 9, the inflation pump 6 includes a first fixing member 100, the detection portion 13 is provided with a second groove 301 on a circumferential side wall of the detection portion 13, the second groove 301 is used for accommodating a part of the detection assembly 20, and the first fixing member 100 is connected to the detection portion 13, and is used for limiting displacement of the detection assembly 20 on the detection portion 13. For example, the detection assembly 20 includes a second circuit board 21 and an air pressure sensor 22, and the air pressure sensor 22 is connected to the second circuit board 21. The detection portion 13 is provided with the second groove 301, a fourth groove (also referred to as a first detection groove) 3010 and a second air channel 1002. The second groove 301 is disposed on the circumferential side wall of the detection portion 13. During installation, a part of the second circuit board 21 enters the second groove 301 through an outside of the detection portion 13 and then moves to a preset position. A sealing ring is disposed in the fourth groove 3010. The second circuit board 21 is electrically connected to the first circuit board 2 on the outside of the detection portion 13, the first fixing member 100 is disposed on the second circuit board 21, the first fixing member 100 is fixedly connected to the detection portion 13 through a screw, and the air pressure sensor 22 is disposed on a side, facing away from the first fixing member 100, of the second circuit board 21 and is disposed in the second air channel 1002, so that air pressure detection is realized.

Specifically, the second circuit board 21 is formed as a plate-shaped structure, the air pressure sensor 22 is installed on the second circuit board 21 and protrudes from a surface of the second circuit board 21, the fourth groove 3010 is used for accommodating at least a part of the second circuit board 21, i.e., a groove wall of the fourth groove 3010 covers the circumferential side wall of the at least a part of the second circuit board 21, and the first fixing member 100 is provided with a through hole for a screw passing through, so as to achieve fixation of the first fixing member 100 and the detection portion 13, thereby realizing sealed connection between the second circuit board 21 and the detection portion 13.

Figure 4:
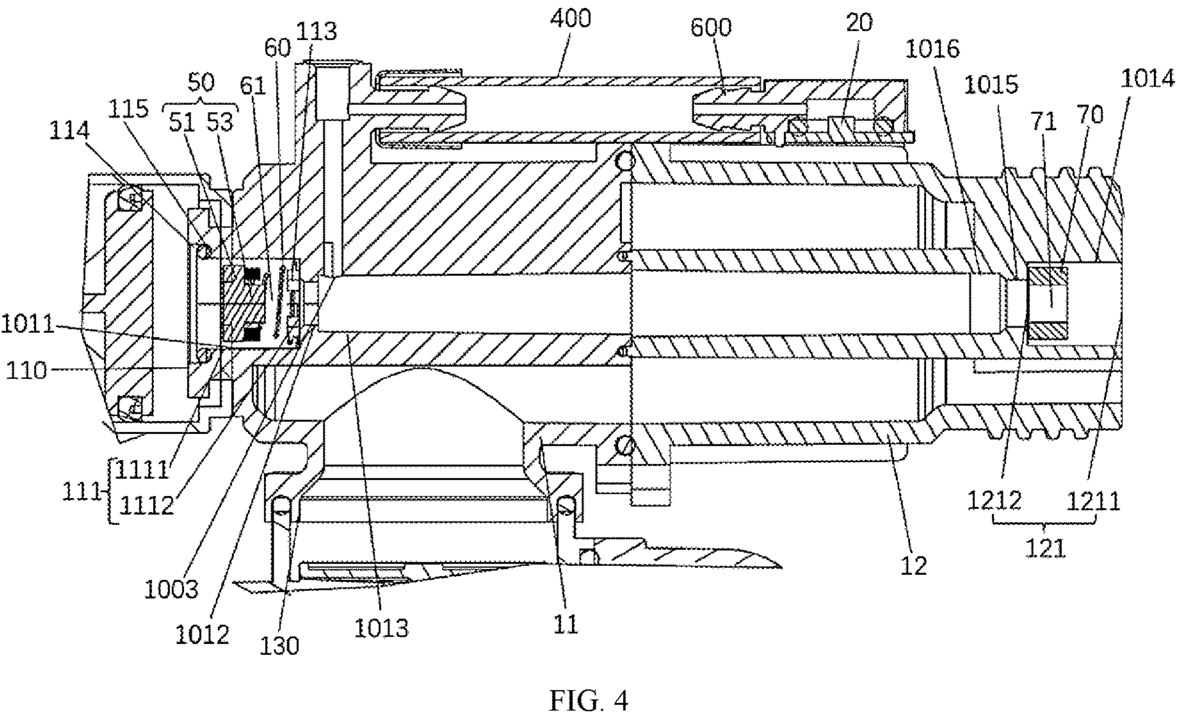
FIG. 4 is a schematic diagram of the partial enlarged structure in FIG. 3.
Figure 14:
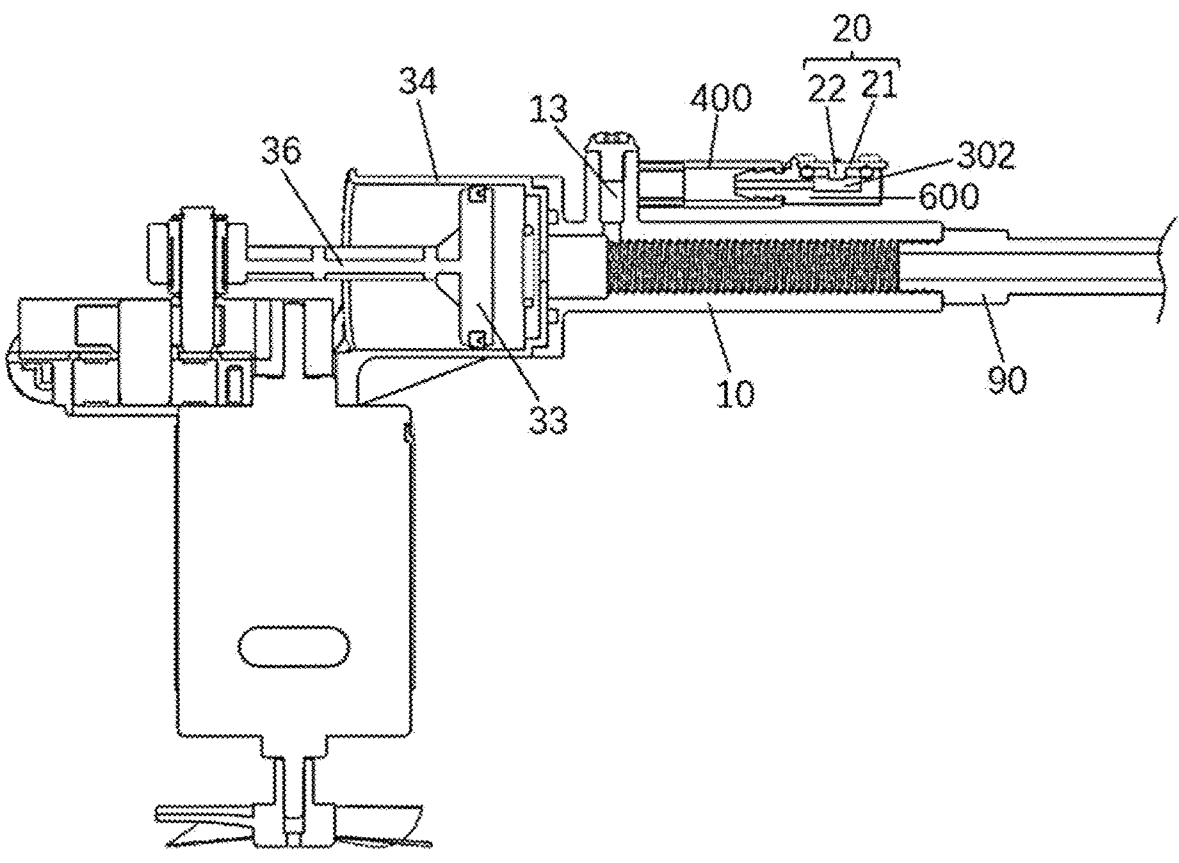
FIG. 14 is a schematic structural diagram of an assembly of a first hose and a first air guide member in an emergency device according to an embodiment of the present disclosure.
Figure 18:
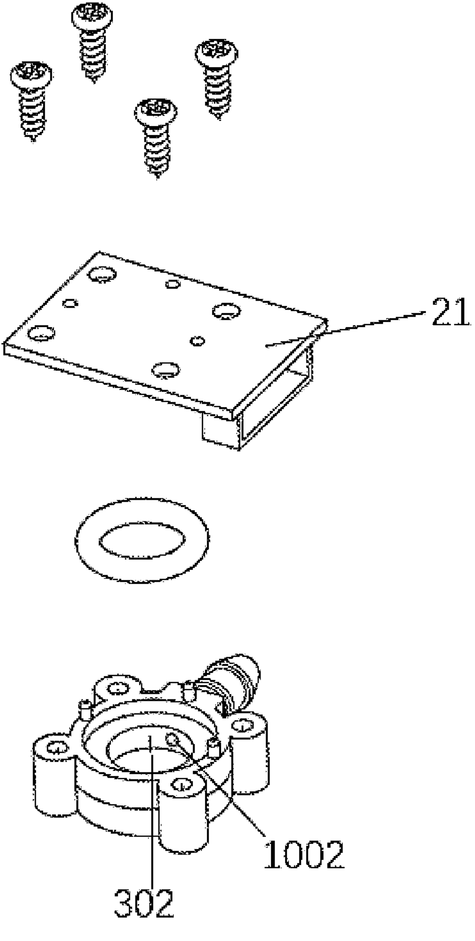
FIG. 18 is a schematic exploded structural diagram of a detection assembly in an emergency device according to an embodiment of the present disclosure.

In a second optional method, as shown in FIG. 4, FIG. 14 and FIG. 18, the inflation pump 6 includes a first hose 400 and a first air guide member 600, the first hose 400 is of a flexible tubular structure, an end of the first hose 400 is in sealed connection to the detection portion 13, and another end of the first hose 400 is in sealed connection to the first air guide member 600, thereby achieving guidance of airflow and meeting requirements of an installation space. The first air guide member 600 may be in sealed connection to the first hose 400 either by an interference fit or by fastening with a fastener. The first air guide member 600 is formed as a cylindrical structure, an end of the first air guide member 600 is connected to the first hose 400, and another end of the first air guide member 600 is used to install the detection assembly 20.

Specifically, as shown in FIG. 4 and FIG. 18, the first air guide member 600 is provided with a first groove 302, and the first groove 302 is used for accommodating a part of the detection assembly 20, thereby realizing fixation of the detection assembly 20 and the first air guide member 600. The first groove 302 is connected to the first hose 400, so that airflow can flow to the detection assembly 20. The first air guide member 600 is in sealed connection to the detection assembly 20, for example, the sealed connection may be achieved by clamping a sealing member between the first air guide member 600 and the detection assembly 20. More specifically, the detection assembly 20 includes a second circuit board 21 and an air pressure sensor 22, the air pressure sensor 22 on the second circuit board 21 is embedded in the first groove 302, and the first groove 302 surrounds a circumferential side wall of the air pressure sensor 22. In an optional embodiment, the second circuit board 21 is provided with a through hole for a screw passing through, so as to realize connection between the second circuit board 21 and the first air guide member 600, thereby realizing installation and fixation of the detection assembly 20.

In this embodiment, as shown in FIG. 3, FIG. 4 and FIG. 6, the connecting pipe 10 includes a first air pipe 101, and the first air pipe 101 is formed as a cylindrical hole-shaped structure, and is provided with a first air channel 1001 for outputting the first airflow. The first air pipe 101 includes a first sub-first air pipe 1011 and a second sub-first air pipe 1012, the first sub-first air pipe 1011 includes a first air inlet port 111, the first air inlet port 111 includes a first sub-first air inlet port 1111 and a second sub-first air inlet port 1112, and a cross-sectional area of the first sub-first air inlet port 1111 is greater than a cross-sectional area of the second sub-first air inlet port 1112. The first accommodating space 112 is formed by the first sub-first air pipe 1011 and the cylinder air outlet portion 35, the first sub-first air pipe 1011 is provided with at least one first protrusion 113 on an inner wall of the first sub-first air pipe 1011, and the first protrusion 113 is used to prevent the first check valve 50 from blocking the second sub-first air inlet port 1112. For example, the first protrusion 113 is disposed on an inner wall of the first sub-first air pipe 1011, and the inner wall is on a side where the first sub-first air pipe 1011 is connected to the second sub-first air pipe 1012, or the first protrusion 113 is disposed on an inner wall of the first sub-first air pipe 1011, and the inner wall is perpendicular to or substantially perpendicular to a central axis of the cylinder air outlet port 352.

It should be noted that, in this embodiment, the cross-sectional area is represented as an area of a cross section perpendicular to a flowing direction of airflow.

In addition, in this embodiment, as shown in FIG. 4 and FIG. 6, the first check valve 50 is provided with a base 51 and a fourth protrusion 52. At least one fourth protrusion 52 is disposed at an edge of the base 51, and the edge is on an end, facing the connecting pipe 10, of the base 51. The fourth protrusion 52 is used to prevent the first check valve 50 from blocking the first air inlet portion 110 or the second sub-first air inlet port 1112. A cross-sectional area of the base 51 is greater than a cross-sectional area of the cylinder air outlet port 352, so as to realize a function of guiding airflow in one direction.

In this embodiment, as shown in FIG. 4 and FIG. 6, the inflation pump 6 includes an elastic member 60, the elastic member 60 may be a spring, the elastic member 60 and the first check valve 50 are disposed in the first accommodating space 112, and the first check valve 50 is disposed between the elastic member 60 and the cylinder air outlet port 352 for allowing the first power device 30 to provide the first airflow to the first air outlet portion 120 through the cylinder air outlet port 352.

Further, in this embodiment, the elastic member 60 is provided with a first through hole 61, the elastic member 60 is in a compressed state in the first accommodating space 112, and when the inflation pump 6 is in a non-working state, the elastic member 60 provides an acting force to the first check valve 50, so that the first check valve 50 blocks the cylinder air outlet port 352.

Further, the first check valve 50 is provided with a base 51, a second protrusion 53 and a third protrusion 54, and a cross-sectional area of the base 51 is greater than a cross-sectional area of the cylinder air outlet port 352, so as to achieve a function of guiding airflow in one direction. The second protrusion 53 extends into the first through hole 61, so as to achieve a limiting effect to the elastic member 60. The third protrusion 54 extends into the cylinder air outlet port 352. For example, the base 51 and the second protrusion 53 are cylinders, the third protrusion 54 is a cone, a cross-sectional area of the second protrusion 53 is less than the cross-sectional area of the base 51, and a central axis of the second protrusion 53 and a central axis of the base 51 are on a same straight line or substantially on a same straight line.

Specifically, the cylinder air outlet port 352 includes a first sub-cylinder air outlet port 3521 and a second sub-cylinder air outlet port 3522, the cylinder air outlet port 352 is of a stepped hole structure, and a cross-sectional area of the first sub-cylinder air outlet port 3521 is greater than that of the second sub-cylinder air outlet port 3522. More specifically, the third protrusion 54 described above extends into the first sub-cylinder air outlet port 3521 or the second sub-cylinder air outlet port 3522, so as to achieve positioning assembly and sealing.

Figure 11:
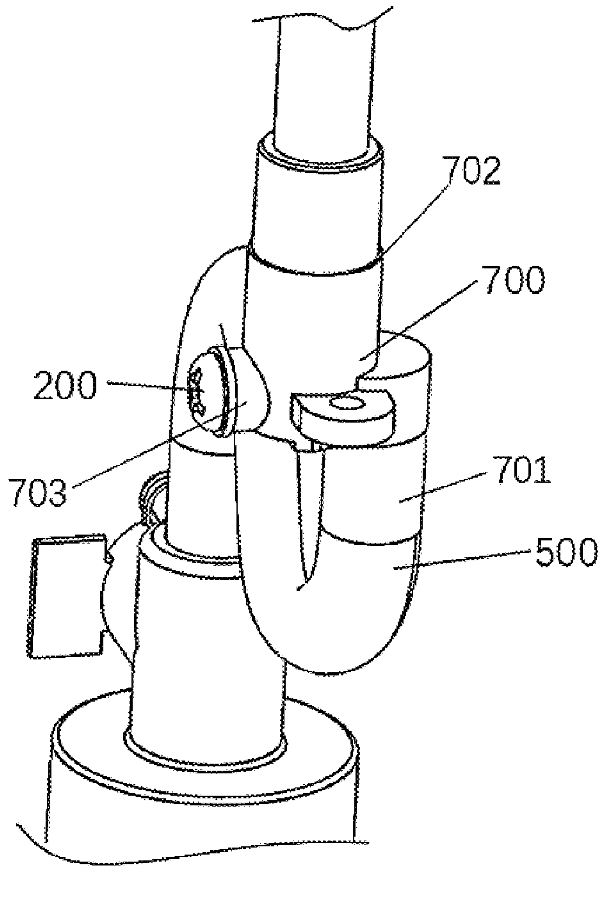
FIG. 11 is a schematic structural diagram of a second fixing member and a second air guide member in an inflation pump with a second hose in an emergency device according to an embodiment of the present disclosure.

In addition, in this embodiment, as shown in FIG. 10 and FIG. 11, the inflation pump 6 includes a second hose 500 and a second air guide member 700, the second hose 500 is of a flexible tubular structure, an end of the second hose 500 is in sealed connection to the first air outlet portion 120, another end of the second hose 500 is in sealed connection to an end of the second air guide member 700, and another end of the second air guide member 700 is used for connecting to a device to be inflated, so that airflow in the second hose 500 is transmitted to the device to be inflated through the second air guide member 700.

In this embodiment, the device to be inflated may be an inflatable paddle board or a tire of an automobile.

Furthermore, in this embodiment, as shown in FIG. 10 and FIG. 11, the second air guide member 700 is provided with a third air inlet port 701 and a third air outlet port 702, and is used for guiding airflow coming from the second hose 500. The third air inlet port 701 is in sealed connection to the second hose 500, and the sealed connection may be achieved by an interference fit or by adding a fastener to the second hose 500. The third air outlet port 702 is used for connecting to a device to be inflated, the third air inlet port 701 and the third air outlet port 702 are not coaxial, and the second air guide member 700 may be an adapter.

Further, as shown in FIG. 11, since the third air inlet port 701 and the third air outlet port 702 are not coaxial, the second air guide member 700 manufactured using a casting process may be provided with a connecting hole 703 for demolding. However, disposal of the connecting hole 703 may cause air leakage of airflow entering the second air guide member 700 through the third air inlet port 701, and therefore, in order to solve this problem, in this embodiment, the inflation pump 6 further includes a second fixing member 200, the second air guide member 700 is provided with the connecting hole 703 that connects to both the third air inlet port 701 and the third air outlet port 702, and the second fixing member 200 is used for sealing the connecting hole 703, so that all the airflow entering the second air guide member 700 through the third air inlet port 701 can be fully discharged through the third air outlet port 702, thereby achieving an effective airflow guiding effect of the second air guide member 700. In this embodiment, the second fixing member 200 may be a screw, a rubber plug, or other structures, as long as the second fixing member 200 can seal the connecting hole 703 to ensure that only the third air inlet port 701 and the third air outlet port 702 are connected within the second air guide member 700.

In this embodiment, as shown in FIG. 3, FIG. 4 and FIG. 6, a third groove 114 is disposed on a side, facing the cylinder air outlet portion 35, of the first air inlet portion 110, a fifth protrusion 353 is disposed on the cylinder air outlet portion 35, the fifth protrusion 353 is provided with the cylinder air outlet port 352, and the third groove 114 is used for accommodating a part or all of the fifth protrusion 353.

Further, in this embodiment, as shown in FIG. 3 and FIG. 4, a first sealing member 115 is disposed between the third groove 114 and the fifth protrusion 353, and the first sealing member 115 may be a sealing ring.

In a preferred embodiment, as shown in FIG. 6, FIG. 12, FIG. 13, FIG. 15 and FIG. 16, the first cylinder assembly 32 includes a connecting rod 36, a cylinder sealing member 37, a piston 33, and a cylinder 34. The cylinder sealing member 37 plays a sealing role when the first airflow is generated by the inflation pump 6, thereby meeting air supply requirements for the first cylinder assembly 32. The piston 33 is disposed in the cylinder 34 and is provided with a first side portion 331 and a second side portion 332. The first side portion 331 is connected to the connecting rod 36, and the second side portion 332 and the first side portion 331 are disposed opposite to each other along an axial direction of the piston 33. The first side portion 331 is provided with a first surface 3311 on a side, facing the second side portion 332, of the first side portion 331, the second side portion 332 is provided with a second surface 3321 on a side, facing the first side portion 331, of the second side portion 332, a piston accommodating space 3300 is formed by the first surface 3311 and the second surface 3321, and the piston accommodating space 3300 is used for accommodating at least a part of the cylinder sealing member 37, so that the cylinder sealing member 37 is installed between the first side portion 331 and the second side portion 332. For example, a maximum distance between an outer edge of a projection, on the first surface 3311, of the second side portion 332 and a center of the first surface 3311 is less than a maximum distance between an outer edge of the first surface 3311 and the center of the first surface 3311. In another example, a cross-sectional area of the second side portion 332 is less than or equal to a cross-sectional area of the first side portion 331.

Specifically, in this embodiment, the second side portion 332 is provided with at least one side groove 333 on a periphery of the second side portion 332, an opening of the side groove 333 faces a side wall of the cylinder 34, the side wall of the cylinder 34 is parallel or substantially parallel to a motion direction of the piston 33, so as to provide an operation space for installation of the cylinder sealing member 37, so that the cylinder sealing member 37 is installed between the first side portion 331 and the second side portion 332, thereby improving working efficiency.

In a preferred embodiment, the second side portion 332 is provided with four side grooves 333 that are either identical or substantially identical, and are either evenly or substantially evenly distributed, and the two side grooves 333 form a group and are disposed opposite to each other along a radial direction of the piston 33, so that a projection, on the first side portion 331, of the second side portion 332 is of a cross-shaped structure or a substantially cross-shaped structure, so as to ensure that the four side grooves 333 are evenly distributed. In this embodiment, the four side grooves 333 are evenly spaced around a circumferential side wall of the piston 33, so as to ensure reliable assembly of the cylinder sealing member 37, thereby improving sealing reliability.

Figure 13:
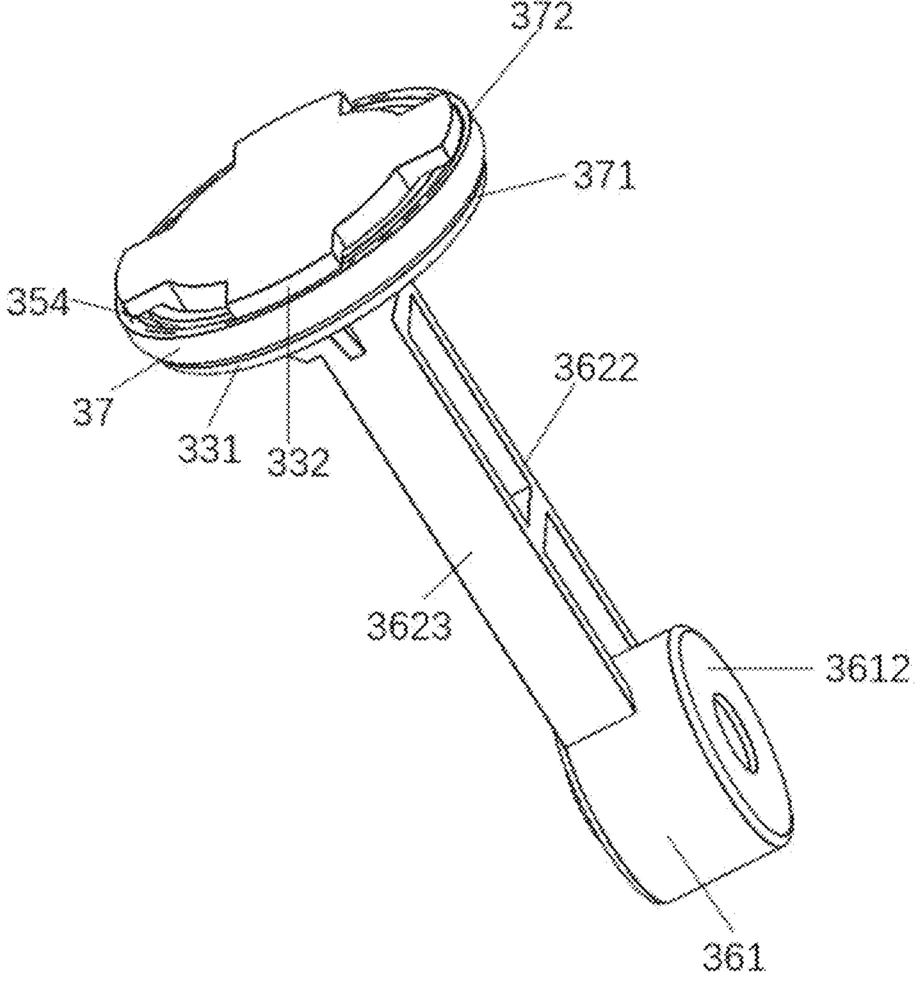
FIG. 13 is a schematic structural diagram of an assembly of a piston and a cylinder sealing member in an emergency device according to an embodiment of the present disclosure.
Figure 15:
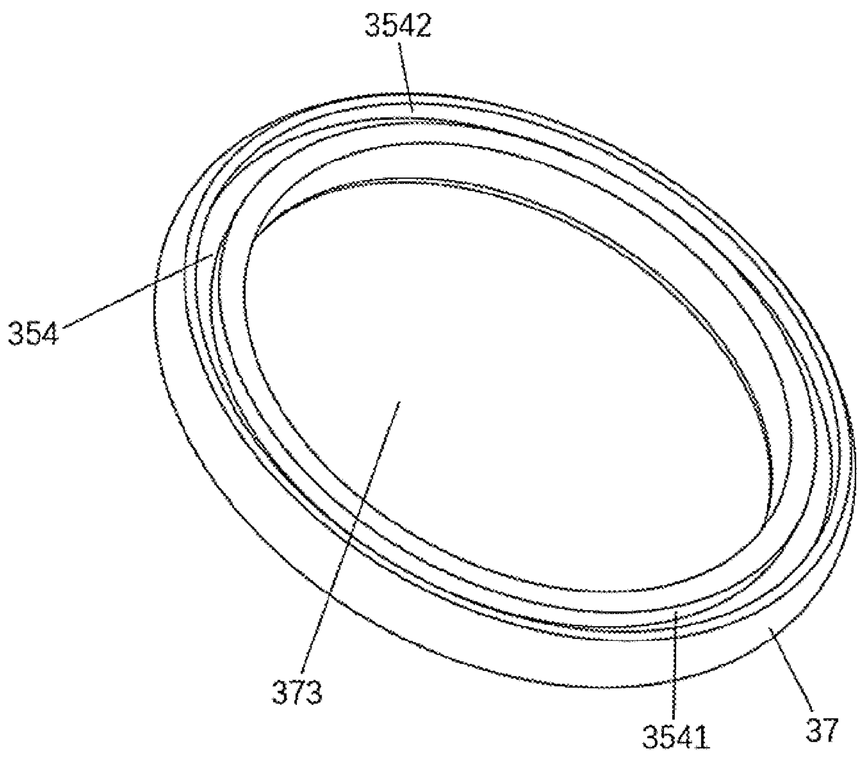
FIG. 15 is a schematic structural diagram of a cylinder sealing member in an emergency device according to an embodiment of the present disclosure.
Figure 16:
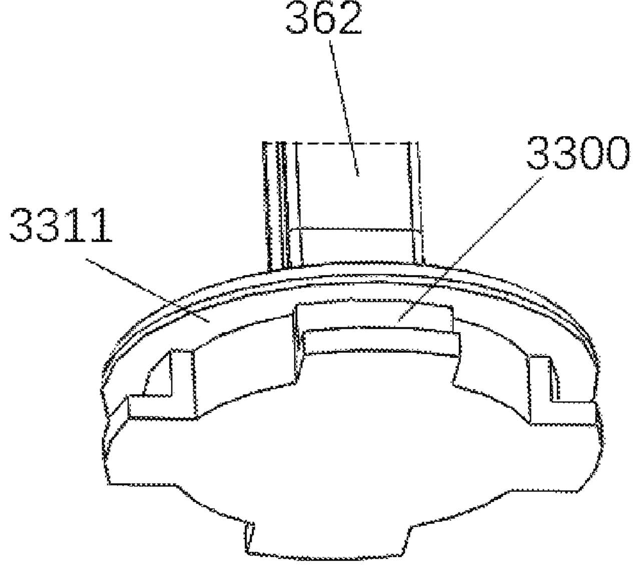
FIG. 16 is a schematic structural diagram of a piston in an emergency device according to an embodiment of the present disclosure.

Further, in this embodiment, as shown in FIG. 13 and FIG. 15, the cylinder sealing member 37 is formed as an annular structure and is provided with a fifth through hole (also referred to as a sealing member through hole) 373 and a fifth groove (also referred to as a sealing member groove) 354, an opening of the fifth groove 354 faces the second side portion 332, and the piston 33 passes through the fifth through hole 373, so as to allow at least a part of the cylinder sealing member 37 to be assembled between the first side portion 331 and the second side portion 332. For example, the fifth groove 354 is provided with a first arm 3541 and a second arm 3542, a distance between the first arm 3541 and an axis of the fifth through hole 373 is less than a distance between the second arm 3542 and the axis of the fifth through hole 373, the piston accommodating space 3300 is used for accommodating at least a part of the first arm 3541, and a length, along a motion direction of the piston 33, of the first arm 3541 is less than or equal to a length, along the motion direction of the piston 33, of the second arm 3542. In another example, the cylinder sealing member 37 is disposed between a plane where the first surface 3311 is located and a plane where the second surface 3321 is located.

Furthermore, the cylinder sealing member 37 is provided with a first end face 371 and a second end face 372, the first end face 371 is disposed close to the first side portion 331, and the second end face 372 is disposed close to the second side portion 332. For example, a cross-sectional area of the second end face 372 is greater than a cross-sectional area of the first end face 371. In another example, a distance between an outer edge of a projection, on the second end face 372, of the first end face 371 and a center of the second end face 372 is less than or equal to a distance between an outer edge of the second end face 372 and the center of the second end face 372. In an optional embodiment, a cross section, parallel to a motion direction of the piston 33, of the cylinder sealing member 37 is of a trapezoidal structure, so that a circumferential side wall of the cylinder sealing member 37 is an inclined face, so as to meet a structure where the cross-sectional area of the second end face 372 is greater than that of the first end face 371. In another optional embodiment, in an axial direction of the cylinder sealing member 37, a middle portion of a circumferential side wall of the cylinder sealing member 37 protrudes from two portions of the cylinder sealing member 37, and the two portions are on two ends of the circumferential side wall of the cylinder sealing member 37, so that the cylinder sealing member 37 is formed as a structure that is higher in the middle and lower at the two ends, and the higher middle portion can abut against a side wall of the cylinder 34.

In this embodiment, as shown in FIGS. 1 to 6 and FIG. 17, the emergency device further includes a second power device 40 and a second check valve 4010, the connecting pipe 10 includes a first air pipe 101 and a second air pipe 102, and the first air pipe 101 is disposed in the second air pipe 102. Specifically, the first air pipe 101 is formed as a cylindrical hole-shaped structure, the second air pipe 102 is formed as an annular hole-shaped structure, and the first air pipe 101 is disposed in the second air pipe 102, i.e., the second air pipe 102 is disposed around an outer circumference of the first air pipe 101, so that a pipe cross-sectional area of the second air pipe 102 is greater than a pipe cross-sectional area of the first air pipe 101. The detection portion 13 is connected to the first air pipe 101, the connecting pipe 10 is provided with a second air inlet portion 130 and a second air outlet portion 140, the second air inlet portion 130 is provided with a second air inlet port 131, the second air outlet portion 140 is provided with a second air outlet port 141, the first air pipe 101 is provided with a first air inlet port 111 and a first air outlet port 121, and the second air pipe 102 is provided with a second air inlet port 131 and a second air outlet port 141.

Figure 17:
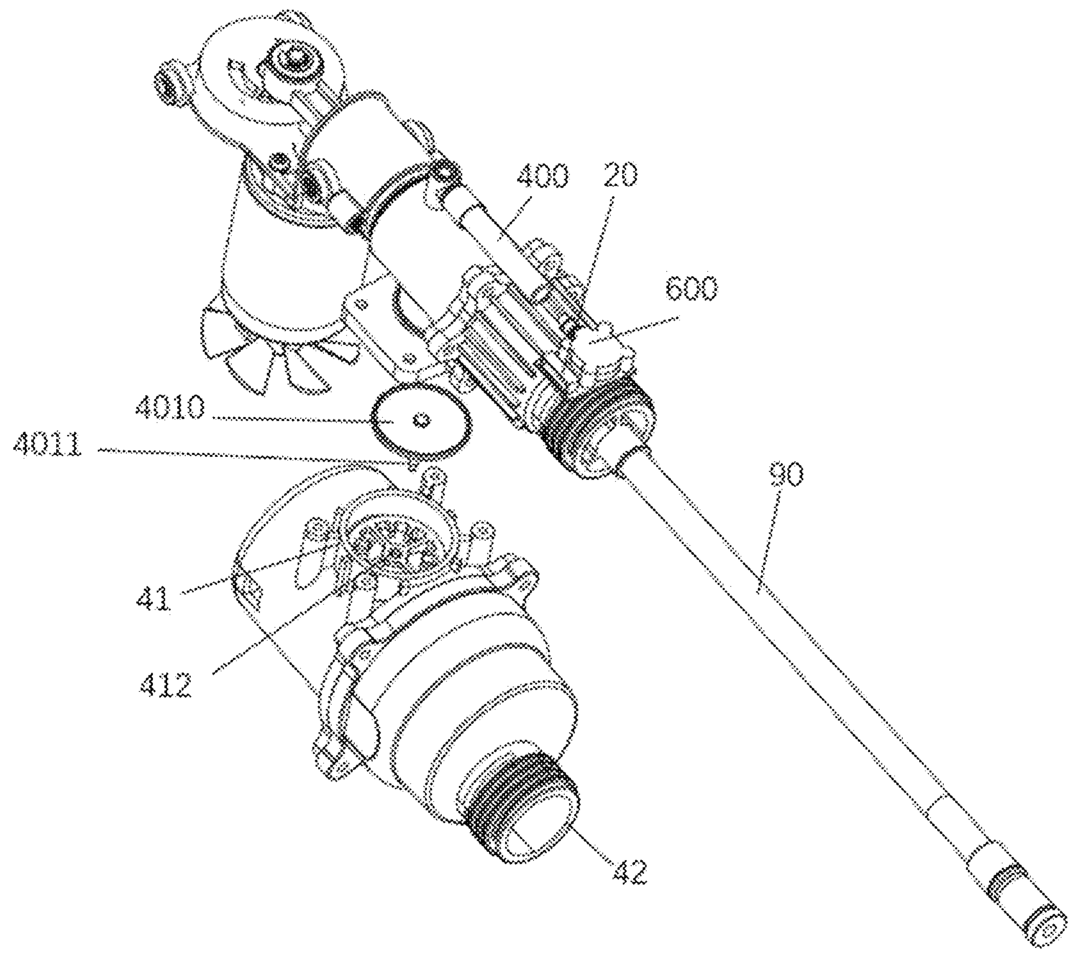
FIG. 17 is a schematic exploded structural diagram of a second housing and a connecting pipe in an emergency device according to an embodiment of the present disclosure.

Specifically, the second power device 40 shown in FIG. 1, FIG. 3 and FIG. 17 includes a second housing 401, the second housing 401 is provided with a large-flow air inlet portion 42 and a large-flow air outlet portion 41, the large-flow air outlet portion 41 is connected to the second air inlet portion 130, the large-flow air outlet portion 41 is provided with a large-flow air outlet port 411, a large-flow accommodating space 400 is formed by the large-flow air outlet portion 41 and the connecting pipe 10, the second check valve 4010 is disposed in the large-flow accommodating space 4001, and is used to allow the second power device 40 to provide second airflow to the second air outlet portion 140, and the second airflow flows from the second air inlet port 131 of the second air inlet portion 130 to the second air outlet port 141 of the second air outlet portion 140. The second check valve 4010 is provided with a sixth protrusion 4011, the large-flow air outlet portion 41 is provided with a second through hole 412, the sixth protrusion 4011 passes through the second through hole 412, the second through hole 412 provides guidance for movement of the second check valve 4010 within the large-flow accommodating space 4001, and when the second power device 40 provides the second airflow to the second air outlet portion 140, the sixth protrusion 4011 is located in the second through hole 412.

It should be noted that the second power device 40 includes a second driving assembly and a second inflation assembly (not shown in the figure), the second driving assembly may be a brush motor or a brushless motor, the second inflation assembly is a fan blade, and the motor and the fan blade may be selected according to actual needs. After the fan blade and the motor are assembled, the fan blade and the motor are installed in the second housing 401, and when the motor works, air may be sucked through the large-flow air inlet portion 42 and then forms the second airflow.

In this embodiment, the inflation pump 6 can output large-flow gas, and can also output high-pressure gas, so as to meet requirements for inflating a paddle board and a tire of an automobile. When the paddle board is inflated, an initial air pressure value of the paddle board is relatively low, the second power device 40 outputs the large-flow gas to the paddle board, and when an air pressure value of the paddle board is relatively high and an inflation volume of the second power device 40 is greatly reduced, the second power device 40 is turned off, and the first power device 30 is activated to output the high-pressure gas to the paddle board until the paddle board reaches an expected high air pressure value, so that inflation time is greatly shortened, thereby improving inflation efficiency and avoiding a situation where the first power device 30 is damaged due to overheating caused by directly activating the first power device 30; and when the tire of the automobile is inflated, the first power device 30 is directly activated to output the high-pressure gas to the tire of the automobile until the tire of the automobile reaches an expected high-air-pressure value, so that different inflation requirements of users are met.

In this embodiment, an air pressure of the first airflow is greater than an air pressure of the second airflow, so as to ensure that the first airflow can meet high-pressure inflation requirements of a tire of an automobile.

Further, in a unit of time, a gas volume of the second airflow flowing through the large-flow air outlet port 411 is greater than a gas volume of the first airflow flowing through the cylinder air outlet port 352, or a cross-sectional area of the large-flow air outlet port 411 is greater than a cross-sectional area of the cylinder air outlet port 352, so that the second power device 40 can output large-flow gas to a paddle board, while the first power device 30 can output high-pressure gas to a tire of an automobile or the paddle board.

Specifically, the first air pipe 101 includes a first sub-first air pipe 1011, a second sub-first air pipe 1012, and a third sub-first air pipe 1013 which are connected in sequence, the first sub-first air pipe 1011 includes a first air inlet port 111, the first air inlet port 111 includes a first sub-first air inlet port 1111 and a second sub-first air inlet port 1112, a cross-sectional area of the first sub-first air inlet port 1111 is greater than a cross-sectional area of the second sub-first air inlet port 1112, the first accommodating space 112 is formed by the first sub-first air pipe 1011 and the cylinder air outlet portion 35, and a pipe cross-sectional area of the third sub-first air pipe 1013 is greater than a pipe cross-sectional area of the second sub-first air pipe 1012.

In a preferred embodiment, the first air pipe 101 and the second air pipe 102 are coaxial or substantially coaxial, or the first air outlet port 121 and the second air outlet port 141 are coaxial or substantially coaxial, so as to ensure structural rationality and esthetics of the inflation pump 6.

Further, in this embodiment, as shown in FIG. 3 and FIG. 4, the first air pipe 101 further includes a fourth sub-first air pipe 1014 and a fifth sub-first air pipe 1015 which are connected in sequence, the fourth sub-first air pipe 1014 includes a first air outlet port 121, the first air outlet port 121 includes a first sub-first air outlet port 1211 and a second sub-first air outlet port 1212, a cross-sectional area of the first sub-first air outlet port 1211 is greater than a cross-sectional area of the second sub-first air outlet port 1212, the first airflow flows through the first sub-first air outlet port 1211 through the second sub-first air outlet port 1212, and the fourth sub-first air pipe 1014 is used for connecting to a device to be inflated.

Further, in this embodiment, as shown in FIG. 3 and FIG. 4, the first air pipe 101 further includes a fourth sub-first air pipe 1014, a fifth sub-first air pipe 1015, and a sixth sub-first air pipe 1016 which are connected in sequence, the fourth sub-first air pipe 1014 includes a first air outlet port 121, the first air outlet port 121 includes a first sub-first air outlet port 1211 and a second sub-first air outlet port 1212, and the first airflow sequentially flows through the sixth sub-first air pipe 1016, the fifth sub-first air pipe 1015, and the fourth sub-first air pipe 1014. A cross-sectional area of the first sub-first air outlet port 1211 is greater than a cross-sectional area of the second sub-first air outlet port 1212, a pipe cross-sectional area of the sixth sub-first air pipe 1016 is greater than a pipe cross-sectional area of the fifth sub-first air pipe 101, and the fourth sub-first air pipe 1014 is used for connecting to a device to be inflated.

In a preferred embodiment, as shown in FIG. 3 and FIG. 4, an air pipe sealing member 70 is provided in the fourth sub-first air pipe 1014, the air pipe sealing member 70 is formed as an annular structure, and a third through hole 71 is disposed in the air pipe sealing member 70. The air pipe sealing member 70 is used for sealed connection between an inflation device and a device to be inflated, so as to ensure that connection between an external air pipe 90 and the fourth sub-first air pipe 1014 is tight and reliable, thereby avoiding occurrence of air leakage at the connection between the fourth sub-first air pipe 1014 and the external air pipe 90.

Specifically, in a preferred embodiment, as shown in FIG. 3 and FIG. 4, a diameter of the third through hole 71 is less than a diameter of the second sub-first air outlet port 1212, so that an air pressure of gas in the second sub-first air outlet port 1212 and air tightness between the fourth sub-first air pipe 1014 and the external air pipe 90 are improved to a certain extent.

In a preferred embodiment, as shown in FIG. 4, the connecting pipe 10 includes a first connecting pipe 11 and a second connecting pipe 12, so that the connecting pipe 10 is formed as a split structure divided into two parts along an axial direction of the connecting pipe 10. The first connecting pipe 11 is disposed upstream of the second connecting pipe 12 along a flowing direction of the first airflow or the second airflow, so that the first connecting pipe 11 is provided with the first air inlet portion 110 and the second air inlet portion 130, thereby facilitating assembly of the first power device 30, the second power device 40 and the connecting pipe 10. The second connecting pipe 12 is provided with a first air outlet portion 120 and a second air outlet portion 140, the first connecting pipe 11 is detachably connected to the second connecting pipe 12, the first inflation assembly 311 is provided with the detection portion 13 close to connection between the first cylinder assembly 32 and the first connecting pipe 11, the first accommodating space 112 is formed by the cylinder air outlet portion 35 and the first connecting pipe 11, the first airflow flows through the first air outlet portion 120 through the first air inlet portion 110, a large-flow accommodating space 4001 is formed by a large-flow air outlet portion 41 and the first connecting pipe 11, and the second airflow flows through the second air outlet portion 140 through the second air inlet portion 130.

Figure 19:
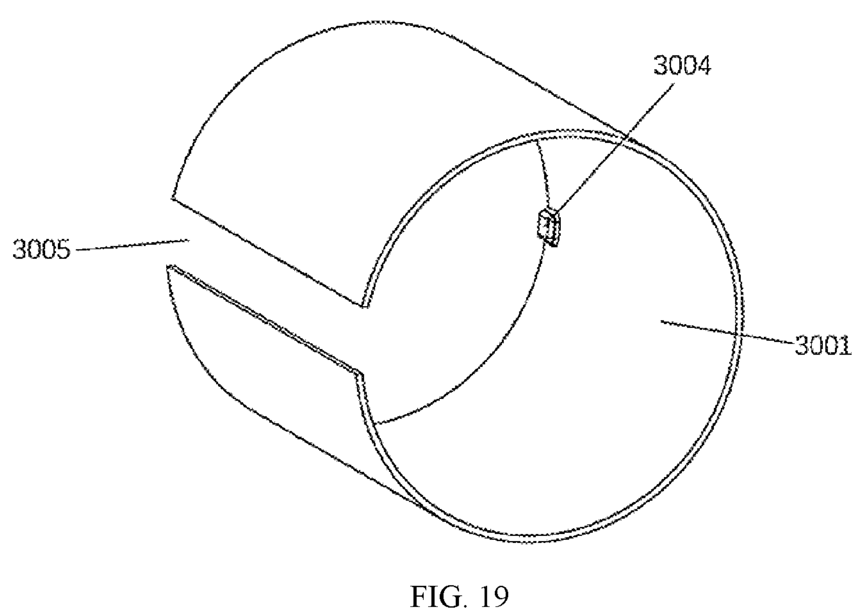
FIG. 19 is a schematic structural diagram of a second protection member in an emergency device according to an embodiment of the present disclosure.

In this embodiment, as shown in FIG. 1 and FIG. 19, the first driving assembly 31 includes a motor 3003 and a second protection member 3001, the motor 3003 is provided with a first junction portion 3002 on a side, facing the second protection member 3001, of the motor 3003, the second protection member 3001 covers the motor 3003, information related to the motor 3003 may be marked on the second protection member 3001, and the second protection member 3001 plays a role in protecting the motor 3003. The second protection member 3001 is provided with a second junction portion 3004 on a side, facing the motor 3003, of the second protection member 3001. The first junction portion 3002 is in clamped connection to the second junction portion 3004, the second protection member 3001 is further provided with a first opening 3005, and the first opening 3005 is used to facilitate easy installation of the second protection member 3001 onto the motor 3003. For example, the motor 3003 is provided with the first junction portion 3002 on an end, close to the first inflation assembly 311, of the motor 3003, a cross section of the second protection member 3001 is C-shaped or substantially C-shaped, the cross section is perpendicular to a rotation axis of the motor 3003, the first junction portion 3002 is a groove or an opening, and the second junction portion 3004 is a protrusion that can extend into the groove or the opening.

In this embodiment, as shown in FIG. 3, FIG. 6, FIG. 12 and FIG. 13, the first cylinder assembly 32 includes a connecting rod 36, a piston 33, and a cylinder 34. Specifically, the connecting rod 36 includes a rotating portion 361, a rod body 362 and a piston connecting portion 363, the rotating portion 361 includes a first end 3611 and a second end 3612, the first end 3611 and the second end 3612 are disposed opposite to each other, the rotating portion 361 is connected to the first transmission assembly 3111, the piston connecting portion 363 is connected to the piston 33, and the piston 33 is disposed in the cylinder 34. The rod body 362 includes a first face 3621 and a second face 3622, both the first face 3621 and the second face 3622 are perpendicular or substantially perpendicular to an axis of the rotating portion 361, the first face 3621 and the second face 3622 are disposed opposite to each other, and a distance between a plane where the first end 3611 is located and the first face 3621 is not equal to a distance between a plane where the second end 3612 is located and the second face 3622, so that layout requirements and stress requirements of the first cylinder assembly 32 are met.

Figure 12:
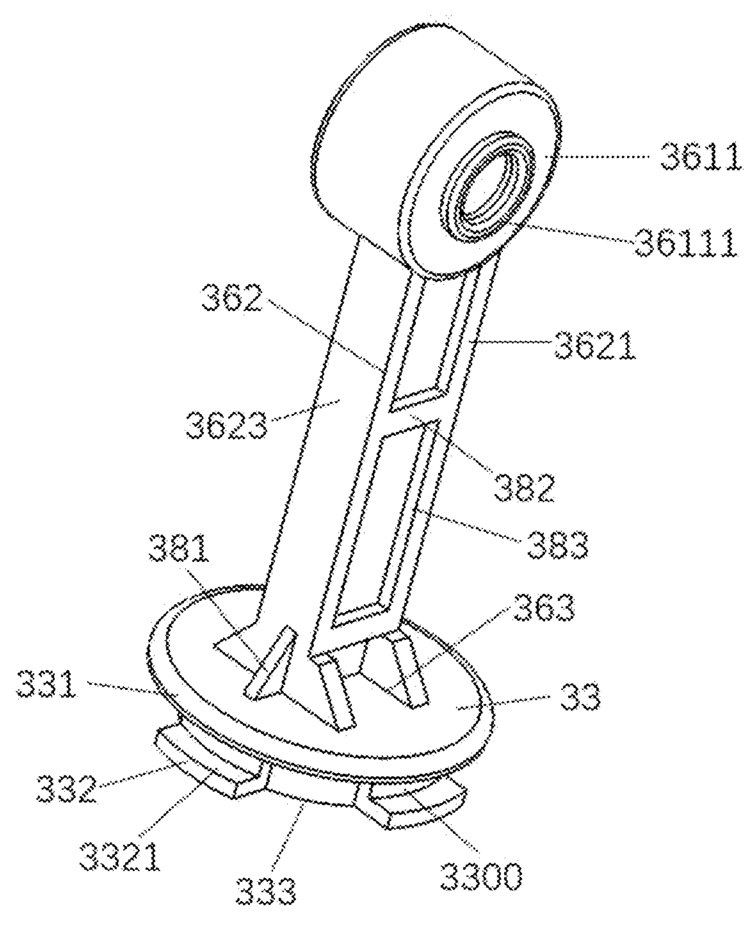
FIG. 12 is a schematic structural diagram of an assembly of a piston and a connecting rod in an emergency device according to an embodiment of the present disclosure.

More specifically, as shown in FIG. 12 and FIG. 13, the distance between the plane where the first end 3611 is located and the first face 3621 is less than the distance between the plane where the second end 3612 is located and the second face 3622, so that bearing capacity of the connecting rod 36 is ensured, thereby prolonging service life of the inflation pump 6. A seventh protrusion 36111 is disposed on the first end 3611, and the seventh protrusion 36111 is of an annular structure, which facilitates movement of the rotating portion 361.

In this embodiment, as shown in FIG. 3, FIG. 6 and FIG. 12, the rod body 362 includes a reinforcing face 3623 and a first reinforcing rib 381, the reinforcing face 3623 is parallel to or substantially parallel to an axis of the rotating portion 361, and the first reinforcing rib 381 is disposed on the reinforcing face 3623 and is connected to the piston 33. For example, the rob body 362 includes two reinforcing faces 3623 and two first reinforcing ribs 381, each reinforcing face 3623 is provided with one first reinforcing rib 381, the two reinforcing faces 3623 are oppositely disposed between the first face 3621 and the second face 3622, and the first reinforcing rib 381 is connected to the piston 33. Preferably, the first reinforcing rib 381 may be of a triangular plate-shaped structure or a strip-shaped rod-shaped structure, so that the first reinforcing rib 381, the reinforcing face 3623 and the piston 33 enclose a triangular structure, so as to improve a connection strength between the connecting rod 36 and the piston 33. When the first reinforcing rib 381 is of the triangular plate-shaped structure, two sides of the triangle are connected to the reinforcing face 3623 and the piston 33, respectively, and when the first reinforcing rib 381 is of the strip-shaped rod-shaped structure, two ends, along a length direction of the rod-shaped structure, of the rod-shaped structure are connected to the reinforcing face 3623 and the piston 33, respectively.

In a preferred embodiment, a projection, on the piston 33, of an end, away from the piston 33, of the first reinforcing rib 381 falls within a region where a contact surface between the piston 33 and the first reinforcing rib 381 is located.

In this embodiment, as shown in FIG. 12 and FIG. 13, the rod body 362 includes a first face 3621 and a second face 3622, the first face 3621 is perpendicular to or substantially perpendicular to an axis of the rotating portion 361, the first face 3621 and the second face 3622 are disposed opposite to each other, and a distance between a plane where the first reinforcing rib 381 is located and the first face 3621 is less than a distance between the plane where the first reinforcing rib 381 is located and the second face 3622, so as to ensure a structural strength of the connecting rod 36.

In this embodiment, as shown in FIG. 3, FIG. 6, FIG. 12, FIG. 13 and FIG. 16, the first cylinder assembly 32 includes a connecting rod 36, a piston 33, and a cylinder 34, the connecting rod 36 includes a sixth groove (also referred to as a rod groove) 383 and a second reinforcing rib 382, the sixth groove 383 plays a role in reducing weight, the second reinforcing rib 382 is disposed in the sixth groove 383, the piston 33 is provided with a first side portion 331 and a second side portion 332, the first side portion 331 is connected to the connecting rod 36, the second side portion 332 is disposed opposite to the first side portion 331, the first side portion 331 is provided with a first surface 3311 on a side, facing the second side portion 332, of the first side portion 331, and the second reinforcing rib 382 is parallel or substantially parallel to the first surface 3311. For example, the sixth groove 383 may be formed by recessing inward from at least one of the first face 3621 or the second face 3622 described above. The sixth groove 383 is provided with the second reinforcing rib 382 extending along a first direction, i.e., the second reinforcing rib 382 is formed as a strip-shaped structure extending along the first direction, so as to ensure that the connecting rod 36 provided with the sixth groove 383 has sufficient structural strength. In this embodiment, the first direction is perpendicular to a motion direction of the piston 33.

In this embodiment, as shown in FIG. 3, FIG. 7, FIG. 9 and FIG. 14, a connection port 1003 is formed at connection between the first air channel 1001 and the second air channel 1002, and a distance, along a motion direction of the piston 33, between the connection port 1003 and the cylinder air outlet port 352 is greater than or equal to 0.5 cm and less than or equal to 2 cm, so as to allow the inflation pump 6 to achieve miniaturization and light weight, and a structure is reasonable, i.e., when the detection portion 13 is located on the cylinder 34, a minimum distance, along the motion direction of the piston 33, between the connection port 1003 and the cylinder air outlet port 352 is 0.5 cm, so as to facilitate the inflation pump 6 in providing a space for fixing the detection assembly 20, and when the detection portion 13 is located on the connecting pipe 10, a maximum distance, along the motion direction of the piston 33, between the connection port 1003 and the cylinder air outlet port 352 is 2 cm, so as to facilitate the inflation pump 6 in providing the first accommodating space 112 that meets requirements. Setting the distance, along the motion direction of the piston 33, between the connection port 1003 and the cylinder air outlet port 352 plays an important role in miniaturization and light weight, and facilitates the inflation pump 6 in meeting functional requirements. For example, the distance, along the motion direction of the piston 33, between the connection port 1003 and the cylinder air outlet port 352 is equal to 0.5 cm or 1.5 cm.

According to the emergency device provided by the present disclosure, the internal power supply can output the first current to an automobile, and the first power device outputs the first airflow, so as to realize an integration of an inflation apparatus and an emergency device, so that the emergency device may function as an emergency power supply for igniting the automobile, and can also meet inflation requirements. The detection assembly can detect the air pressure information, so as to meet requirements for different air pressures during inflation. In addition, the inflation pump can output the first airflow and the second airflow, so as to output large-flow gas and high-pressure gas, thereby meeting requirements for inflating a paddle board and a tire of an automobile. When the paddle board is inflated, an initial air pressure value of the paddle board is relatively low, the second power device outputs the large-flow gas to the paddle board, and when an air pressure value of the paddle board is relatively high and an inflation volume of the second power device is greatly reduced, the second power device is turned off, and the first power device is activated to output the high-pressure gas to the paddle board until the paddle board reaches an expected high air pressure value, so that inflation time is greatly shortened, thereby improving inflation efficiency and avoiding a situation where the first power device is damaged due to overheating caused by directly activating the first power device; and when the tire of the automobile is inflated, the first power device is directly activated to output the high-pressure gas to the tire of the automobile until the tire of the automobile reaches an expected high-air-pressure value, so that different inflation requirements of users are met.

Finally, it should be noted that: the above-mentioned embodiments are only specific embodiments of the present disclosure, so as to illustrate the technical solutions of the present disclosure, and not to limit the technical solutions of the present disclosure, and the scope of protection of the present disclosure is not limited thereto. Although the present disclosure is described in detail with reference to the foregoing embodiments, a person having ordinary skill in the art should understand: any person having ordinary skill in the art may still modify or easily conceive changes to the technical solutions described in the foregoing embodiments within the technical scope disclosed in the present disclosure, or equivalently replace some of the technical features therein; and these modifications, changes or substitutions do not cause the essence of the corresponding technical solutions to deviate from the spirit and the scope of the technical solutions of the embodiments of the present disclosure, and shall fall within the scope of protection of the present disclosure. Therefore, the scope of protection of the present disclosure shall be subject to the scope of protection of the claims.

What is claimed is:

1. An emergency device, comprising:

a first housing; and an inflation pump, an internal power supply, a first cable, a second cable, a first circuit board and an output terminal that are disposed in the first housing, wherein the internal power supply is electrically connected to the output terminal through the first cable, and the first cable is used to output a first current for activating an automobile;

the inflation pump is provided with a first power device, a detection assembly, a first hose and a first air guide member, and the detection assembly comprises a second circuit board and an air pressure sensor;

the internal power supply is electrically connected to the first circuit board and the second circuit board, the first circuit board is electrically connected to the inflation pump through the second cable, the second cable is used to output a second current, and a diameter of the first cable is greater than a diameter of the second cable;

the first power device comprises a detection portion, a first air outlet portion, a first air channel and a second air channel, the first air channel is configured to provide a first airflow to the first air outlet portion, the detection portion is provided with the second air channel, and the first air channel is connected to the second air channel; and an end of the first hose is in sealed connection to the detection portion, and another end of the first hose is in sealed connection to the first air guide member, the first air guide member is provided with a first groove, and the first groove is connected to the first hose, the air pressure sensor is installed on the second circuit board and protrudes from a surface of the second circuit board, the first groove surrounds a circumferential side wall of the air pressure sensor, the first air guide member is in sealed connection to the second circuit board, and the detection assembly is used to detect air pressure information of the second air channel.

2. The emergency device according to claim 1, wherein the emergency device comprises two first cables, a color of one first cable is red, and a color of another first cable is black, the first current is greater than the second current, and the first hose is of a flexible tubular structure.

3. The emergency device according to claim 1, wherein the inflation pump is provided with a first check valve, the first power device comprises a first driving assembly and a first inflation assembly, the first inflation assembly comprises a first transmission assembly, a first cylinder assembly and a connecting pipe, an end of the first transmission assembly is connected to the first driving assembly, another end of the first transmission assembly is connected to an end of the first cylinder assembly, the connecting pipe is provided with a first air inlet portion and the first air outlet portion, and another end of the first cylinder assembly is detachably connected to the first air inlet portion; the first cylinder assembly is provided with a cylinder air outlet portion, the first inflation assembly is provided with the first air channel and the second air channel, the first driving assembly is configured to provide power to the first inflation assembly, so that the first inflation assembly is capable of providing the first airflow to the first air outlet portion through the first air channel; and the first inflation assembly is provided with a detection portion close to connection between the first cylinder assembly and the connecting pipe;

a first accommodating space is formed by the cylinder air outlet portion and the connecting pipe; and the first check valve is disposed in the first accommodating space, and is configured to allow the first power device to provide the first airflow to the first air outlet portion.

4. The emergency device according to claim 3, wherein the first cylinder assembly comprises a connecting rod, a piston and a cylinder, an end of the connecting rod is connected to the first transmission assembly, and another end of the connecting rod is connected to the piston; and the cylinder comprises a first cylinder and a second cylinder, a diameter of the first cylinder is greater than a diameter of the second cylinder, the piston is disposed in the first cylinder, and the detection portion is disposed on the second cylinder.

5. The emergency device according to claim 3, wherein the emergency device comprises a first protection member, the first protection member is disposed between the connecting pipe and the first housing, the first protection member is provided with a second accommodating space, and the second accommodating space is used for accommodating at least a part of the connecting pipe.

6. The emergency device according to claim 3, wherein the connecting pipe comprises a first air pipe, the first air pipe comprises a first sub-first air pipe and a second sub-first air pipe that are connected in sequence, the first sub-first air pipe comprises a first sub-first air inlet port and a second sub-first air inlet port, a cross-sectional area of the first sub-first air inlet port is greater than a cross-sectional area of the second sub-first air inlet port, the first accommodating space is formed by the first sub-first air pipe and the cylinder air outlet portion.

7. The emergency device according to claim 6, wherein at least one first protrusion is disposed on an inner wall on a side where the first sub-first air pipe is connected to the second sub-first air pipe, and the at least one first protrusion is configured to prevent the first check valve from blocking the second sub-first air inlet port.

8. The emergency device according to claim 3, wherein the first cylinder assembly comprises a connecting rod, a cylinder sealing member, a piston and a cylinder, the piston is disposed in the cylinder and is provided with a first side portion and a second side portion, the first side portion is connected to the connecting rod, and the second side portion is disposed opposite to the first side portion; and a first surface is provided on a side, facing the second side portion, of the first side portion, a second surface is provided on a side, facing the first side portion, of the second side portion, a piston accommodating space is formed by the first surface and the second surface, and the piston accommodating space is configured to accommodate at least a part of the cylinder sealing member.

9. The emergency device according to claim 8, wherein a maximum distance between an outer edge of a projection, on the first surface, of the second side portion and a center of the first surface is less than a maximum distance between an outer edge of the first surface and the center of the first surface.

10. The emergency device according to claim 8, wherein the second side portion is provided with at least one side groove on a periphery of the second side portion, an opening of the at least one side groove faces a side wall of the cylinder, and the side wall of the cylinder is parallel or substantially parallel to a motion direction of the piston.

11. The emergency device according to claim 8, wherein the cylinder sealing member is provided with a first end face and a second end face, the first end face is close to the first side portion, the second end face is close to the second side portion, and a distance between an outer edge of a projection, on the second end face, of the first end face and a center of the second end face is less than or equal to a distance between an outer edge of the second end face and the center of the second end face.

12. The emergency device according to claim 3, wherein the first cylinder assembly comprises a connecting rod, a piston and a cylinder, the connecting rod comprises a rotating portion, a rod body and a piston connecting portion, the rotating portion comprises a first end and a second end, the rotating portion is connected to the first transmission assembly, the first end faces the first transmission assembly, the second end is disposed opposite to the first end, the piston connecting portion is connected to the piston, the piston is disposed in the cylinder, the rod body comprises a first face and a second face, the first face is perpendicular to or substantially perpendicular to an axis of the rotating portion, the second face is disposed opposite to the first face, and a distance between a plane where the first end is located and the first face is less than a distance between a plane where the second end is located and the second face.

13. The emergency device according to claim 3, wherein the inflation pump comprises an elastic member, the elastic member is disposed in the first accommodating space, the first check valve is disposed between the elastic member and the cylinder air outlet port, and the elastic member is in a compressed state in the first accommodating space.

14. The emergency device according to claim 13, wherein the first check valve is provided with a base and a second protrusion, the elastic member is provided with a first through hole, the second protrusion extends into the first through hole, and a cross-sectional area of the base is greater than a cross-sectional area of the cylinder air outlet port.

15. The emergency device according to claim 13, wherein the first check valve is provided with a base and a third protrusion, a cross-sectional area of the base is greater than a cross-sectional area of the cylinder air outlet port, and the third protrusion extends into the cylinder air outlet port.

16. The emergency device according to claim 15, wherein the cylinder air outlet port comprises a first sub-cylinder air outlet port and a second sub-cylinder air outlet port, a cross-sectional area of the first sub-cylinder air outlet port is greater than a cross-sectional area of the second sub-cylinder air outlet port, and the third protrusion extends into the first sub-cylinder air outlet port or the second sub-cylinder air outlet port.

17. The emergency device according to claim 1, wherein the first power device comprises a first driving assembly, the first driving assembly comprises a motor and a second protection member, and the motor is provided with a first junction portion on a side, facing the second protection member, of the motor, the second protection member covers the motor, the second protection member is provided with a second junction portion on a side, facing the motor, of the second protection member, and the first junction portion is in clamped connection to the second junction portion.

18. The emergency device according to claim 17, wherein the second protection member is provided with a first opening.

19. The emergency device according to claim 6, wherein the first air pipe comprises the first sub-first air pipe, the second sub-first air pipe and a third sub-first air pipe that are connected in sequence, and a cross-sectional area of the third sub-first air pipe is greater than a cross-sectional area of the second sub-first air pipe.

20. The emergency device according to claim 3, wherein the connecting pipe comprises a first air pipe, the first air pipe comprises a fourth sub-first air pipe and a fifth sub-first air pipe which are connected in sequence, the fourth sub-first air pipe comprises a first sub-first air outlet port and a second sub-first air outlet port, a cross-sectional area of the first sub-first air outlet port is greater than a cross-sectional area of the second sub-first air outlet port, and the first airflow flows through the first sub-first air outlet port through the second sub-first air outlet port.

* * * * *